(12) United States Patent
Nickolov et al.

(10) Patent No.: US 10,248,630 B2
(45) Date of Patent: *Apr. 2, 2019

(54) DYNAMIC ADJUSTMENT OF SELECT ELEMENTS OF A DOCUMENT

(71) Applicant: Microsoft Technology Licensing, LLC., Redmond, WA (US)

(72) Inventors: Radoslav Petrov Nickolov, Seattle, WA (US); Hai Wang, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 92 days.

This patent is subject to a terminal disclaimer.

(21) Appl. No.: 14/580,062

(22) Filed: Dec. 22, 2014

(65) Prior Publication Data

US 2016/0179757 A1    Jun. 23, 2016

(51) Int. Cl.
*G06F 17/00* (2006.01)
*G06F 17/21* (2006.01)
(Continued)

(52) U.S. Cl.
CPC .......... *G06F 17/212* (2013.01); *G06F 3/0481* (2013.01); *G06F 3/0484* (2013.01);
(Continued)

(58) Field of Classification Search
CPC .... G06F 3/0481; G06F 3/0484; G06F 17/212; G06F 17/30905; G06F 17/2264; G06T 3/4084
(Continued)

(56) References Cited

U.S. PATENT DOCUMENTS 5,513,342 A    4/1996 Leong et al.
5,544,288 A    8/1996 Morgan
(Continued)

FOREIGN PATENT DOCUMENTS

EP    2662836 A1    11/2013

OTHER PUBLICATIONS

Munoz et al., Least-Squares Image Resizing Using Finite Differences, IEEE 2001, pp. 1365-1378.*
(Continued)

*Primary Examiner* — Cong-Lac Huynh
(74) *Attorney, Agent, or Firm* — Newport IP, LLC; Scott Y. Shigeta

(57) ABSTRACT

Technologies are described herein for providing dynamic adjustment of select elements of a document. In some configurations, when a command for scaling a document is received, technologies described herein selectively resize elements of the document and then apply a rendering scale factor to the document. For example, a computing device may render a document having an element, such as a table, and other elements, such as text and images. Upon receiving a command to apply a rendering scale factor to the document, techniques herein determine at least one dimension of the element based on the rendering scale factor. The document including the element with the at least one dimension is then rendered based on the rendering scale factor. By dynamically adjusting one or more dimensions of select elements, the layout of the document may be preserved even when a user zooms into or out of the document.

15 Claims, 10 Drawing Sheets

(51) Int. Cl.
*G06F 17/22* (2006.01)
*G06F 17/30* (2006.01)
*G06F 3/0481* (2013.01)
*G06F 3/0484* (2013.01)

(52) U.S. Cl.
CPC .... *G06F 17/2264* (2013.01); *G06F 17/30905* (2013.01); *G06F 2203/04806* (2013.01)

(58) Field of Classification Search
USPC ........ 715/200, 252, 765, 801, 815, 273, 800
See application file for complete search history.

(56) References Cited

U.S. PATENT DOCUMENTS

| | | | | |
|---|---|---|---|---|
| 5,754,873 | A * | 5/1998 | Nolan | G06F 3/0481 345/472 |
| 5,796,877 | A | 8/1998 | Gusmano | |
| 5,974,431 | A | 10/1999 | Iida | |
| 6,219,465 | B1 | 4/2001 | Nacman | |
| 6,256,650 | B1 | 7/2001 | Cedar et al. | |
| 6,549,935 | B1 | 4/2003 | Lapstun | |
| 7,271,806 | B2 | 9/2007 | Everett | |
| 7,293,243 | B1 * | 11/2007 | Ben-Shachar | G06F 3/1454 715/781 |
| 7,430,712 | B2 | 9/2008 | Arokiaswamy | |
| 7,516,402 | B2 * | 4/2009 | Koivisto | G06F 17/212 715/204 |
| 7,721,192 | B2 | 5/2010 | Milic-Frayling | |
| 7,739,622 | B2 * | 6/2010 | DeLine | G06F 3/0483 345/660 |
| 7,844,889 | B2 | 11/2010 | Rohrbaugh | |
| 7,853,873 | B2 * | 12/2010 | Gotoh | G06K 9/00456 715/243 |
| 7,900,137 | B2 | 3/2011 | Ivarsoy et al. | |
| 7,903,277 | B2 * | 3/2011 | Cudd | G06F 17/212 358/1.18 |
| 8,005,843 | B2 * | 8/2011 | Sweet | G06F 17/21 707/741 |
| 8,094,870 | B2 | 1/2012 | Crookham | |
| 8,307,279 | B1 * | 11/2012 | Fioravanti | G06F 3/0481 715/243 |
| 8,319,800 | B2 | 11/2012 | Pan | |
| 8,484,562 | B2 | 7/2013 | Schorsch | |
| 8,812,969 | B2 | 8/2014 | Hart | |
| 8,812,978 | B2 | 8/2014 | Eschback | |
| 8,832,548 | B2 * | 9/2014 | Duga | G06F 3/0481 715/235 |
| 8,832,594 | B1 * | 9/2014 | Thompson | G06F 3/0481 715/256 |
| 9,037,975 | B1 * | 5/2015 | Taylor | G06F 17/30905 715/733 |
| 9,046,934 | B2 * | 6/2015 | Amano | G06F 3/033 |
| 9,069,731 | B2 * | 6/2015 | Stern | G06F 17/211 |
| 9,189,139 | B2 | 11/2015 | Cohen | |
| 9,348,939 | B2 * | 5/2016 | Andrade | G06F 17/30905 |
| 9,367,756 | B2 | 6/2016 | Pillai | |
| 9,519,729 | B2 * | 12/2016 | Rohrbaugh | G06F 9/4443 |
| 9,754,286 | B2 | 9/2017 | Richardson | |
| 2004/0105127 | A1 * | 6/2004 | Cudd | G06F 17/212 358/1.18 |
| 2005/0028108 | A1 | 2/2005 | Baudisch | |
| 2006/0195784 | A1 * | 8/2006 | Koivisto | G06F 17/212 715/234 |
| 2006/0227153 | A1 * | 10/2006 | Anwar | G06T 3/0012 345/660 |
| 2007/0055931 | A1 | 3/2007 | Zaima | |
| 2007/0150829 | A1 | 6/2007 | Eschbach | |
| 2008/0037873 | A1 * | 2/2008 | Berkner | G06F 17/30905 382/176 |
| 2008/0141120 | A1 * | 6/2008 | White | G06F 3/0236 715/252 |
| 2009/0106653 | A1 * | 4/2009 | Lee | G06F 17/211 715/273 |
| 2009/0109243 | A1 | 4/2009 | Kraft et al. | |
| 2009/0140881 | A1 * | 6/2009 | Sakai | G08G 1/164 340/901 |
| 2009/0190977 | A1 * | 7/2009 | Shimizu | G03G 15/50 399/366 |
| 2009/0254853 | A1 * | 10/2009 | Jacob | G06F 3/048 715/800 |
| 2009/0319888 | A1 | 12/2009 | Oygard | |
| 2010/0029340 | A1 * | 2/2010 | Klassen | G06F 17/30905 455/566 |
| 2011/0072390 | A1 | 3/2011 | Duga | |
| 2012/0110438 | A1 * | 5/2012 | Peraza | G06F 17/214 715/243 |
| 2012/0204098 | A1 * | 8/2012 | Venkata | G06F 17/21 715/243 |
| 2012/0257221 | A1 * | 10/2012 | Okada | H04N 1/46 358/1.2 |
| 2012/0304042 | A1 * | 11/2012 | Pereira | G06F 17/21 715/201 |
| 2012/0311489 | A1 * | 12/2012 | Williams | G06F 3/04883 715/800 |
| 2013/0013464 | A1 * | 1/2013 | Mayle | G06Q 30/0641 705/27.2 |
| 2013/0033521 | A1 | 2/2013 | Karasin | |
| 2013/0033523 | A1 * | 2/2013 | Stovicek | G06F 17/2288 345/649 |
| 2013/0086472 | A1 | 4/2013 | Chiu | |
| 2013/0106907 | A1 * | 5/2013 | Davis | G06F 3/0488 345/629 |
| 2013/0111333 | A1 * | 5/2013 | Taleghani | G06F 17/211 715/252 |
| 2013/0117658 | A1 * | 5/2013 | Fidler | G06F 17/3061 715/234 |
| 2013/0272627 | A1 * | 10/2013 | Chen | G06T 7/0036 382/280 |
| 2014/0118403 | A1 | 5/2014 | Verthein | |
| 2014/0173419 | A1 | 6/2014 | Williamson | |
| 2014/0198055 | A1 | 7/2014 | Barkway | |
| 2014/0208263 | A1 * | 7/2014 | Maklouf | G06T 3/0018 715/802 |
| 2014/0210863 | A1 * | 7/2014 | Osaka | G06T 11/60 345/667 |
| 2015/0169521 | A1 | 6/2015 | Leventhal | |
| 2015/0286860 | A1 * | 10/2015 | Ruiz-Tapiador | G06K 9/32 382/112 |
| 2015/0325236 | A1 * | 11/2015 | Levit | G10L 15/18 704/240 |
| 2015/0331836 | A9 | 11/2015 | Geelnard | |
| 2016/0103927 | A1 | 4/2016 | Garris | |
| 2016/0140250 | A1 * | 5/2016 | Wang | G06F 17/30905 715/238 |
| 2016/0154562 | A1 * | 6/2016 | Freeman | G06F 3/04845 715/800 |
| 2016/0267059 | A1 * | 9/2016 | Ayers | G06F 17/211 |
| 2017/0006184 | A1 | 1/2017 | Arnabat Benedicto | |

OTHER PUBLICATIONS

Fua et al., Hierarchical Parallel Coordinates for Exploration of Large Datasets, ACM 1999, pp. 43-50.*
Wobbrock et al., WebThumb: Interaction Techniques for Small-Screen Browsers, ACM 2002, pp. 205-208.*
Chiu et al., Content Based Automatic Zooming: Viewing Documents on Small Displays, ACM 2008, pp. 817-820.*
Roto et al., Minimap—A Web Page Visualization Method for Mobile Phones, ACM 2006, pp. 35-44.*
Bier et al., A Document Corpus Browser for In-Depth Reading, ACM 2004, pp. 87-96.*
Lienhart et al., Localizing and Segmenting Text in Images and Videos, IEEE 2002, pp. 256-268. (Year: 2002).*
Microsoft, "ScaleTransform Class", Retrieved on: Jun. 4, 2014, Available at: http://msdn.microsoft.com/en-us/library/windows/apps/ windows.ui.xaml.media.scaletransform.aspx, 4 pages.
Microsoft, "Walkthrough: Reader app (JavaScript and Html)", Retrieved on: Jun. 4, 2014 Available at: http://msdn.microsoft.com/en-in/library/windows/apps/hh780610.aspx, 12 pages.

(56) References Cited

OTHER PUBLICATIONS

International Search Report for application No. PCT/US2015/067234, a foreign counterpart for U.S. Appl. No. 14/580,062, dated May 2, 2016, 12 pages.
International Search for application No. PCT/US2015/067236, a foreign counterpart application for U.S. Appl. No. 14/580,017, dated May 3, 2016, 12 pages.
U.S. Appl. No. 14/580,017—Final Office Action dated Jan. 5, 2017, 12 pages.
Bier, et al., "A Document Corpus Browser for In-Depth Reading", ACM 2004, 10 pages.
Lienhart, et al., Localizing and Segmenting Text in Images and Videos, IEEE 2002, pp. 256-268.
Roto, et al., Minimap—A Web page Visualization Method for Mobile Phones, pp. 35-44.
U.S. Appl. No. 14/580,017—Non Final Office Action dated Aug. 11, 2016, 16 pages.
PCT/US2015/067234—Written Opinion of the International Preliminary Examining Authority, dated Nov. 21, 2016, 7 pages.
PCT/US2015/067236—Written Opinion of the International Preliminary Examining Authority, dated Nov. 21, 2016, 7 pages.
"International Preliminary Report on Patentability Issued in PCT Application No. PCT/US2015/067234", dated Mar. 14, 2017, 9 Pages.
International Preliminary Report on Patentability Issued in PCT Application No. PCT/US2015/067236, dated Mar. 14, 2017, 8 Pages.
U.S. Appl. No. 14/580,017—Non Final Office Action dated Mar. 24, 2017, 12 pages.
U.S. Appl. No. 14/580,017—Non Final Office Action dated Mar. 13, 2018, 26 pages.
Virp Rote, et al, "Minimap—A Web Page Visualization Method for Mobile Phones", CHI 2006 Proceedings, Montreal, Quebec, Canada, Apr. 22-27, 2006, 10 pages.
U.S. Appl. No. 14/580,017—Final Office Action dated Oct. 24, 2017, 21 pages.

\* cited by examiner

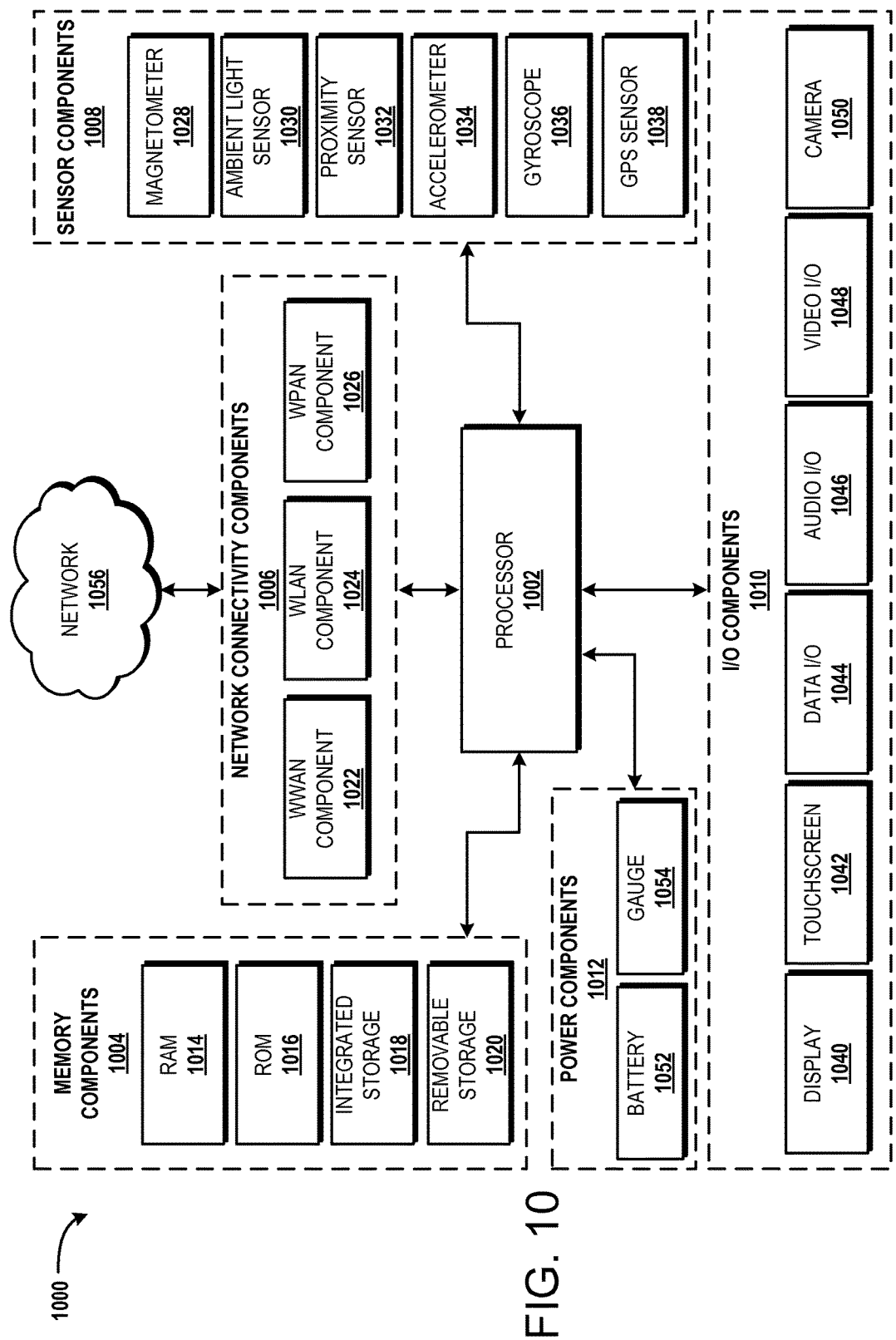

DYNAMIC ADJUSTMENT OF SELECT ELEMENTS OF A DOCUMENT

BACKGROUND

Technologies for rendering documents have provided authors, designers and content consumers with many useful and beneficial features. Whether a document is rendered by a word processing application or a Web browser ("browser"), some existing technologies provide impressive capabilities for displaying new and visually appealing layouts. For example, various elements of a document, such as a column or table, may be used to arrange and/or emphasize text, images, or any other element of a document. As can be appreciated, existing technologies allow authors to express their intent by the use of a wide variety of author-controlled properties that influence the rendering of elements of a document.

Although some existing technologies are able to render documents having complex layouts, some technologies may produce results that may not accurately represent the author's intent. For example, in some scenarios, when a document is rendered in a browser and the end user desires to zoom into one section of the document, some elements may not scale in proportion with other elements. Such scaling issues may produce a rendering where some content, such as text, may be out of proportion to other elements such as images, tables and/or columns of a multi-column layout. Such scaling issues may develop to a point where a rendering no longer conveys the author's intent as artifacts and conflicts begin to overshadow the original layout properties.

In other scenarios, when a user zooms into a document, e.g., applies a scale transform to a rendered document, other scaling issues may produce a less than satisfactory user experience. For instance, when a user zooms into a document to increase the size of the text, the entire document may scale to a point where the text is cut or truncated by the boundaries of a viewport, such as the edge of a display screen. In this scenario, although the legibility of the text may be improved as a result of the increased size, the user may be required to scroll in a horizontal and/or vertical direction to view all of the text. This result sometimes leads to an undesirable user experience.

It is with respect to these and other considerations that the disclosure made herein is presented.

SUMMARY

Technologies are described herein for providing dynamic adjustment of select elements of a document. In some configurations, when a command for scaling a document is received, the technologies described herein selectively resize elements of the document and then apply a rendering scale factor to the document. In one illustrative example, a computing device may render a document having an element, such as a table, and other elements, such as text and images. Upon receiving a command to apply a rendering scale factor to the document, techniques herein determine at least one dimension of the element based on the rendering scale factor. In some configurations, the at least one dimension may be use to modify a layout property of the element. The document including the element with the at least one dimension is then rendered based on the rendering scale factor.

In some configurations, the rendering of the document may include techniques for selectively applying the rendering scale factor and/or other rendering scale factors to various elements. Thus, certain elements may be scaled using one or more rendering scale factors and other elements may remain at their original size. By dynamically adjusting one or more dimensions of select elements, and selectively applying the rendering scale factor to certain elements, the layout of the document may be preserved even when a user zooms into or out of the document.

It should be appreciated that the above-described subject matter may be implemented as a computer-controlled apparatus, a computer process, a computing system, or as an article of manufacture such as a computer-readable storage medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIG. 10 is a computer architecture diagram illustrating a computing device architecture for a computing device capable of implementing aspects of the techniques and technologies presented herein.

DETAILED DESCRIPTION

Figure 1:
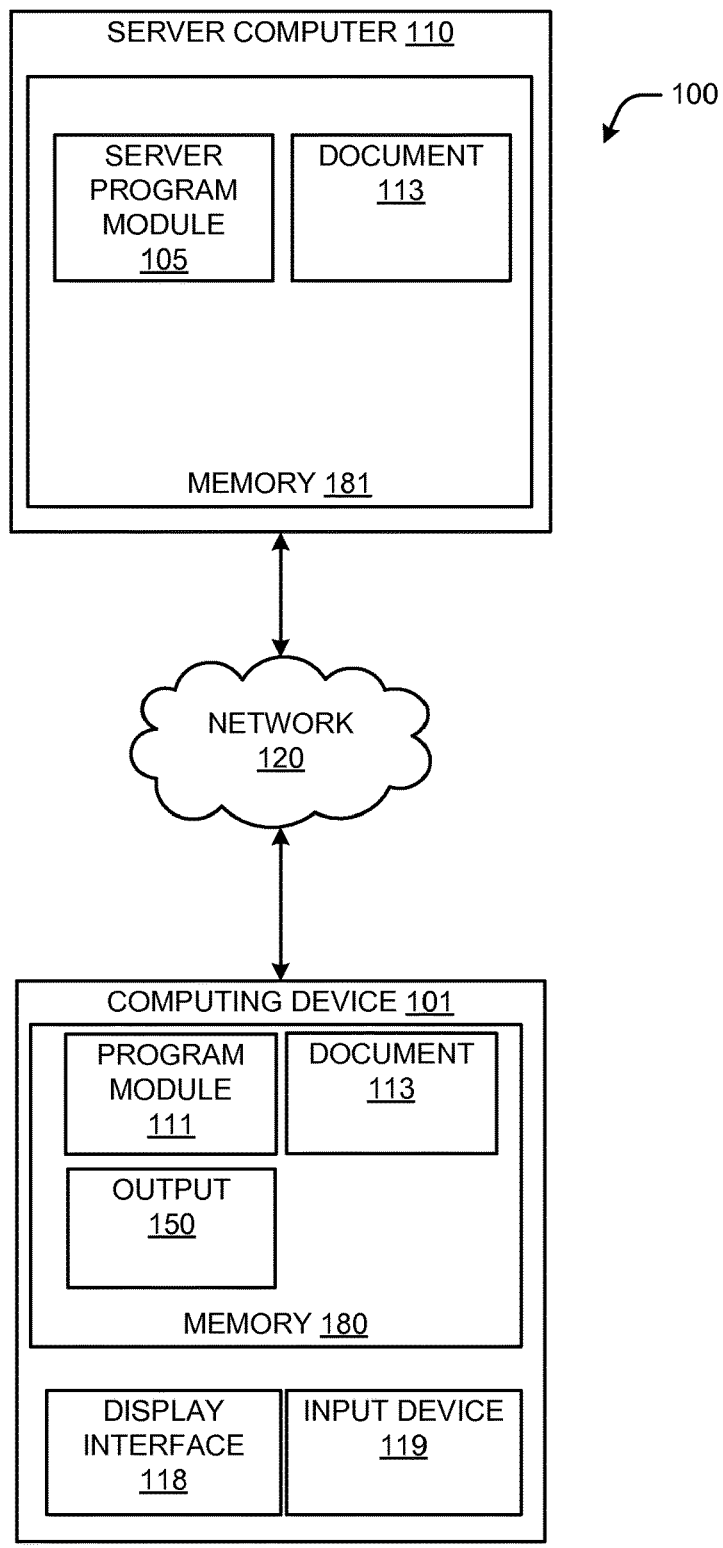
FIG. 1 is a block diagram showing several example components of a system for providing dynamic adjustment of select elements of a document.

The following detailed description is directed to concepts and technologies for providing dynamic adjustment of select elements of a document. In some configurations, when a command for scaling a document is received, technologies described herein selectively resize elements of the document and then apply a rendering scale factor to the document. In one illustrative example, a computing device may render a document having an element, such as a table, and other elements, such as text and images. Upon receiving a command to apply a rendering scale factor to the document, techniques herein determine at least one dimension of the element based on an inverse of the rendering scale factor.

In some configurations, the dimension may be based on an inverse of the rendering scale factor. The document including the element with the at least one dimension is then rendered based on the rendering scale factor. In some configurations, the rendering of the document may include techniques for selectively applying the rendering scale factor and/or other rendering scale factors to various elements. Thus, certain elements may be scaled using one or more rendering scale factors and other elements may remain at their original size.

In some configurations, a program module may be configured to receive, generate and/or render a document, which may be in the form of a mark-up document or any other data structure defining a graphical layout. The program module may also be configured to receive a command to apply a rendering scale factor to the rendered document. The program module may select one or more elements based on one or more factors and/or contextual information. The program module may generate one or more dimensions for the selected elements. The dimensions of the selected elements may be based on an inverse of the rendering scale factor. In some configurations, the generated dimensions for the selected elements may be other values based on one or more factors and/or contextual information. The program module may then render the document including the selected elements configured with the generated dimensions. In addition, the program module may be configured to display the document including the selected elements configured with the generated dimensions on a display interface. Although examples disclosed herein refer to the generation of one or more dimensions of an element, it can be appreciated that such examples are not to be construed as limiting, as techniques herein may involve the process of determining, adjusting and/or modifying the dimensions or other layout parameters of any element of a document.

In one illustrative example, a document includes an element, such as a table having a fixed width and text arranged within the element. Using a program application, such as a browser, the document may be rendered in accordance with a rendering scale. Commands may be received for zooming in or zooming out of the document, where the commands may include a rendering scale factor. As the commands are received, adjustments are made to at least one dimension of the element, such as a table width.

In some configurations, the adjustment to the table width is based on an inverse of the rendering scale factor. For instance, if a zoom command includes a rendering scale factor that doubles the size of the document, as one non-limiting example, techniques disclosed herein may reduce the width of the table to a value that is half of the original width. In yet another example, if a zoom command includes a rendering scale factor that reduces the size of the document in half, techniques disclosed herein may double the width of the table.

In some configurations, the adjustment to the dimension may be weighted depending on one or more factors and/or other contextual information. For example, if a command is received to zoom into a document, where the rendering scale factor doubles the size of the document, the dimension of the element may be adjusted to a value that may be approximate to the inverse of the rendering scale factor. For instance, in some non-limiting examples, the dimension may be reduced to sixty percent or forty percent of the original dimension depending on one or more factors.

In some configurations, one or more dimensions of any number of elements may be adjusted to any value depending on one or more factors and/or related contextual information. The factors may include the data type of any element of the document, the capabilities of the computing device and/or other contextual information. Contextual information may include the contents of an image, text, formatting properties and/or other data. For example, an adjustment to a dimension of one element may be different than an adjustment to a dimension of another element depending on the contents of an image or other contextual information related to the document. In one non-limiting example, an image that contains a mathematical symbol related to text near the image may scale proportionally with the text, and an image that contains a logo in the same document may not be resized when a rendering scale factor is applied to the document.

While the subject matter described herein is primarily presented in the general context of techniques for analyzing and adjusting a width of a table, it can be appreciated that the techniques described herein may apply to any dimension of any type of object, such as an image, text or any other data structure. It can be appreciated that techniques for processing and adjusting a negative margin-bottom disclosed herein may also be utilized to adjust a position of any type of object or content.

While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

In the following detailed description, references are made to the accompanying drawings that form a part hereof, and in which are shown by way of illustration specific configurations or examples. Referring now to the drawings, in which like numerals represent like elements throughout the several figures, aspects of a computing system, computer-readable storage medium, and computer-implemented methodologies for providing dynamic adjustment of select elements of a document. As will be described in more detail below with respect to FIGS. 8-10, there are a number of applications and services that can embody the functionality and techniques described herein.

FIG. 1 is a system diagram showing aspects of one illustrative mechanism disclosed herein for providing dynamic adjustment of select elements of a document. As shown in FIG. 1, a system 100 may include a computing device 101, a server computer 110 and a network 120. In some configurations, the computing device 101 and the server computer 110 may operate as stand-alone devices. In such configurations, the computing device 101 and the server computer 110 may each be configured to perform the techniques described herein. In addition, the server computer 110 and the computing device 101 may be interconnected through one or more local and/or wide area networks, such as the network 120. In such configurations, the computing device 101, the server computer 110 and/or other computing devices may be configured to operate in concert to perform the techniques described herein. It should be appreciated that many more network connections may be utilized than illustrated in FIG. 1.

It can be appreciated that the server computer 110 may be any type of computing device, such as a personal computer, a server or a number of computing devices configured to perform aspects of the techniques described herein. The server computer 110 may include memory 180 for storing a server program module 105 that is configured to process or generate the document 113. It can be appreciated that the server program module 105 may be configured to process, generate and distribute documents, such as document 113, to one or more client computers, such as the computing device 101. The server program module 105 may be a server application such as an APACHE HTTP SERVER or any other program configured to generate, process and/or deliver documents to one or more computers.

The computing device 101 may be any type of computing device, such as a mobile phone, a tablet computer, a server, a laptop computer, a combination of computers or a desktop computer. The computing device 101 may include a display interface 118 for displaying rendered data and an input device 119 for receiving input from a user. The display interface 118 may be a touch-sensitive display screen that is operable to display images and/or video data, and also operable to receive input from the user, input that may involve a touch signal that indicates an input gesture. The computing device 101 may also include memory 180 storing a document 113 and a program module 111.

The computing device 101 may operate as stand-alone device. Thus, the program module 111 of the computing device 101 may be configured to process the techniques described herein. For instance, the program module 111 may be configured to receive, generate and/or render the document 113, which may be in the form of a mark-up document.

As will be described in more detail below, the program module 111 may also be configured to receive a command form the input device 119 to apply a rendering scale factor to the rendered document. The program module 111 may select one or more elements based on one or more factors and/or contextual information. The program module 111 may determine or generate at least one dimension for the selected elements. In some configurations, the generated dimensions for the selected elements may be based on an inverse of the rendering scale factor. In addition, the generated dimensions for the selected elements may be based on one or more factors and/or contextual information.

The program module 111 may then render the document including the selected elements configured with at least one of the generated dimensions. For illustrative purposes, the document including the selected elements configured with at least one of the generated dimensions may be referred to herein as the "output 150." In addition, the program module 111 may be configured to render and display the output 150 on the display interface 118. The rendering and display of the output 150 may be based on the rendering scale factor. In some configurations, certain elements, such as an image, may be scaled back to its original size or scaled at according to another scale factor.

In some configurations, the computing device 101 may operate in conjunction with the server computer 110 to perform the techniques disclosed herein. For instance, the server computer 110 may generate and/or store the document 113. The document 113 may be communicated from the server computer 110 to the computing device 101 where it is processed by the program module 111 to dynamically scale select elements of the document. As will be described in more detail below, by dynamically scaling select elements of the document 113, the layout of the document 113 may be preserved even when a user zooms into or out of the document. As noted in the examples described below, for instance, the size of an element, such as a table or frame, may be maintained even though a user zooms into a document.

Figure 2:
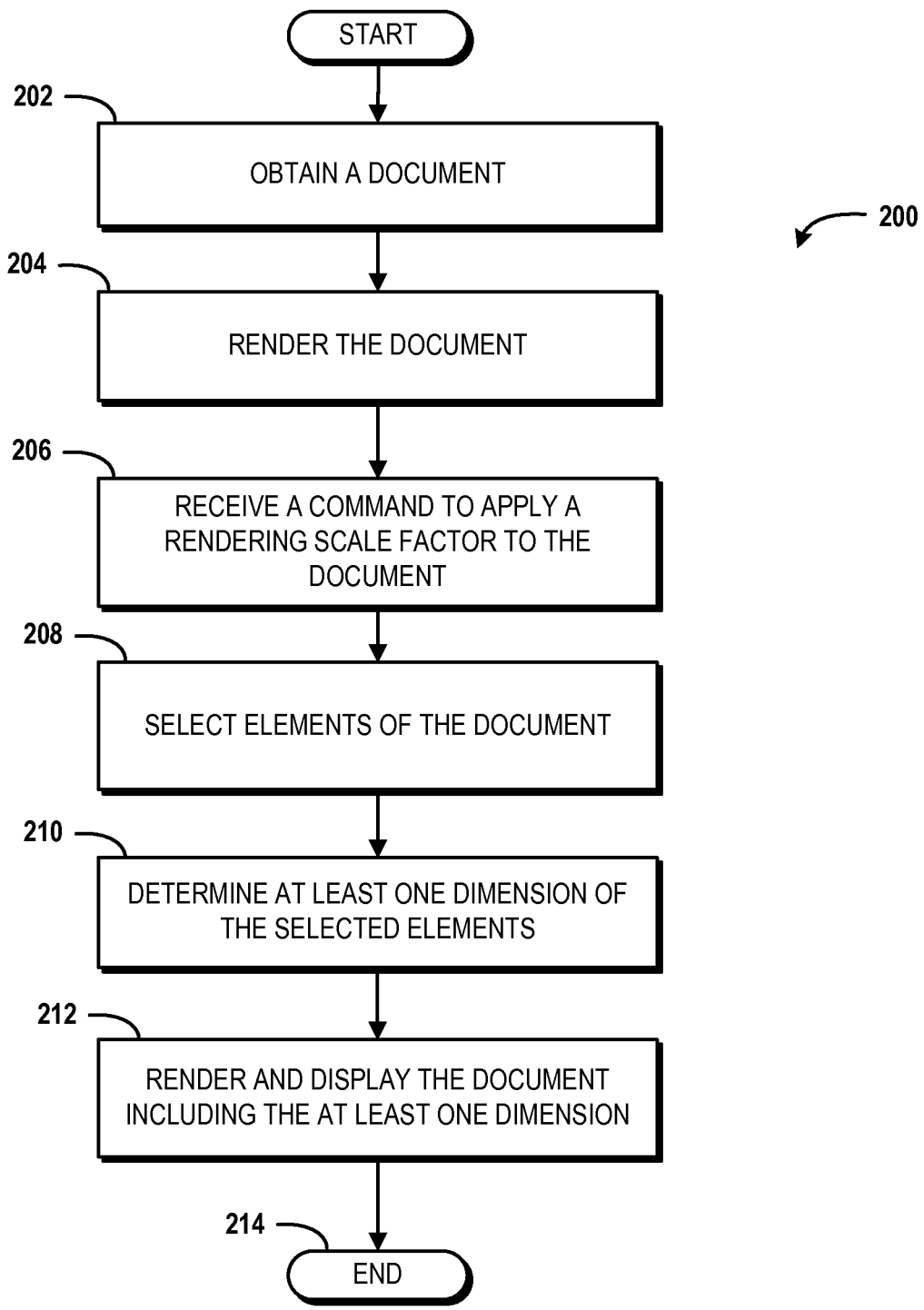
FIG. 2 is a flow diagram illustrating aspects of a method for providing dynamic adjustment of select elements of a document.

Turning now to FIG. 2, aspects of a routine 200 for providing dynamic adjustment of select elements of a document are shown and described below. It should be understood that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the appended claims.

It also should be understood that the illustrated methods can be ended at any time and need not be performed in its entirety. Some or all operations of the methods, and/or substantially equivalent operations, can be performed by execution of computer-readable instructions included on a computer-storage media, as defined below. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules may be implemented in software, in firmware, in special purpose digital logic, and any combination thereof.

As will be described in more detail below, in conjunction with FIGS. 8-10, the operations of the routine 200 are described herein as being implemented, at least in part, by an application, such as the program module 111. Although the following illustration refers to the program module 111, it can be appreciated that the operations of the routine 200 may be also implemented in many other ways. For example, the routine 200 may be implemented, at least in part, by the use of a web browser 810 or any other application configured to perform the techniques described herein. In addition, one or more of the operations of the routine 200 may alternatively or additionally be implemented, at least in part, by the web browser application 810 working in conjunction with other software modules, such as the one or more application servers 908 of FIG. 9.

With reference to FIG. 2, the routine 200 begins at operation 202, where the program module 111 obtains a document 113. As can be appreciated, the document 113 may be received or generated by the program module 111. For example, in some configurations, the document 113 may be generated and/or stored by the server program module 105. The server program module 105 may communicate the document 113 to the program module 111 of the computing device 101 via the network 120. In other configurations, the document 113 may also be generated and/or stored by the computing device 101.

As can be appreciated, the document 113 may include code that defines at least one element, such as a table, column or any other structure or container having layout properties. For example, the document 113 may include a table, frame, container and/or an arrangement of rows and columns for any content, such as text, images, etc. There are a number of ways to define such elements such as a table, e.g., by the use of the <table> tag, and details of such technologies are not disclosed in detail herein. As can be appreciated, the techniques disclosed herein may process and modify any code defining layout parameters and/or dimensions that define a width or height of an element. Although the examples provided herein involve a document, it can be appreciated that techniques disclosed herein may apply to any data structure that defines layout properties of any type of content, which may include text data, images, video data or any other type of data.

Next, at operation 204, the program module 111 renders the document 113. In some configurations, the program module 111 performs one or more rendering functions to calculate a display position for each of the elements defined in the document 113. For illustrative purposes, an element may include any data structure, such as an image, table, frame, text or any other layout container. Data or parameters in the document 113 may define a size, shape, characteristic or display property of each element. Any known rendering technique may be used in operation 204 and such techniques are known in the industry and are thus not described in detail herein.

Next, at operation 206, the program module 111 may receive a command to apply a rendering scale factor to the document 113. As can be appreciated, a command communicating a rendering scale factor is commonly referred to as a zoom command, which may be a function of a document viewing program, such as a web browser. For example, common commands that apply a rendering scale factor to a document include the use of the "Control+" or "Control−" keys, a scroll of the mouse wheel or one or a key combination involving "Control <number>" keys. Thus, once the document 113 is rendered, the program module 111 may then apply a rendering scale factor to the document 113 to adjust the perspective or way in which the document 113 is displayed. For example, a rendering scale factor may be applied to the document 113 to zoom in to the document or zoom out of the document 113.

Next, at operation 208, the program module 111 selects one or more elements of the document 113. Generally described, in operation 208, at least one element of the document 113 may be selected based on one or more factors and/or contextual information. In some configurations, for example, operation 208 may select one or more elements based on a data type of an element and/or display properties of an element. In a non-limiting example, the program module 111 may be configured to select elements having a fixed width, or elements having a fixed width that also contain text. In such examples, tables, columns or frames of a document 113 may be selected in operation 208.

In some configurations, operation 208 may select one or more elements based on a data type of an element and the arrangement of other elements of the document. For instance, if a table has text arranged within the table, the program module 111 may select the table. As described below, in some configurations, operation 208 may select one or more elements based on contextual information associated with the document.

In some non-limiting examples of operation 208, the selection of the elements may be based on a data type and/or other contextual information. For instance, if a document comprises multiple images, a select subset of the images may be selected based on one or more factors, such as the image type and/or contextual information related to the image. Known techniques for determining contextual information related to an image may be utilized in operation 208. Such techniques may involve an analysis of metadata related to the image to determine the contextual information. In addition, technologies for analyzing an image, such as shape or line analysis, face recognition, or other like technologies may be used determine the contextual information.

As will be described below and shown in FIG. 6 and FIG. 7, for example, by use of the techniques described herein, an image of an equation may be selected, and an image of a logo, may not be selected. These examples are provided for illustrative purposes only and are not to be construed as limiting. As it can be appreciated that any combination of factors and/or contextual information may be used to select one or more elements of the document.

Next, in operation 210, the program module 111 may determine one or more dimensions of the selected elements. As summarized above, one or more dimensions of the selected elements are determined to mitigate scaling issues that may arise when the rendering scale factor is applied to the document 113. In operation 210, one or more dimensions are determined and/or generated based on one or more factors and/or other contextual information. In some configurations, for example, one or more dimensions may be based on an inverse of the rendering scale factor. In one illustrative example, if the rendering scale factor of a received zoom command indicates that the rendered document 113 is to be increased to 200%, one or more dimensions of the selected elements may be reduced to 50% of its original size.

In some configurations, operation 210 may also utilize a weighting factor that is based on one or more factors and/or other contextual information. Any factor or any type of contextual information may be used to determine the weighting factor. In one non-limiting example, the weighting factor may vary based the magnitude of the rendering scale factor. For instance, the reduction of the one or more dimensions may follow a non-linear adjustment based on the rendering scale factor. Thus, in such an example, if the document 113 is to be increased to 200%, a dimension of a selected element may be reduced by 50%. However, if the document 113 is to be increased to 800%, the dimension of the selected element may only be reduced by 60%. Such examples are provided for illustrative purposes and are not to be construed as limiting.

Next, at operation 212 the program module 111 renders and displays the document, e.g., the output 150, that includes the selected elements configured with the generated dimensions. The rendering and the display of the output 150, may be based on the rendering scale factor. As can be appreciated, the rendering of the document according to the rendering scale factor may increase or decrease the size in which elements of the document 113 are rendered. It is known that a scale factor is a quantity or value which scales or multiplies some quantity. Techniques for applying a rendering scale factor to a document 113 is known and thus details of such an operation are not described in detail herein.

In some configurations, the program module 111 may be configured to selectively apply the rendering scale factor to certain elements of the document 113. As summarized above, the selection of the elements may be based on one or more factors and/or contextual information. For instance, in a non-limiting example, the program module 111 may be configured to apply the rendering scale factor to all elements of the document except for certain types of data, such as images or certain types of images. As summarized above, contextual information may be derived from the content of the document and other information received by the program module 111. The contextual information may be used to determine if the rendering scale factor will be applied to select elements of the document.

In some configurations, known techniques for analyzing the contents of an image may be used to determine the contextual meaning of the objects depicted in the image. In addition, known techniques may also be used for analyzing the contents of the document to determine the contextual meaning of other content of the document 113, which may include the analysis of text, formatting properties and other content. Based on the contextual meaning derived from the image and other content, the program module 111 may determine if the rendering scale factor may be applied to select elements of the document. An illustrative example of such a configuration is shown in FIG. 6 and FIG. 7 and described in more detail below. After operation 212, the routine 200 terminates at operation 214.

Figure 3:
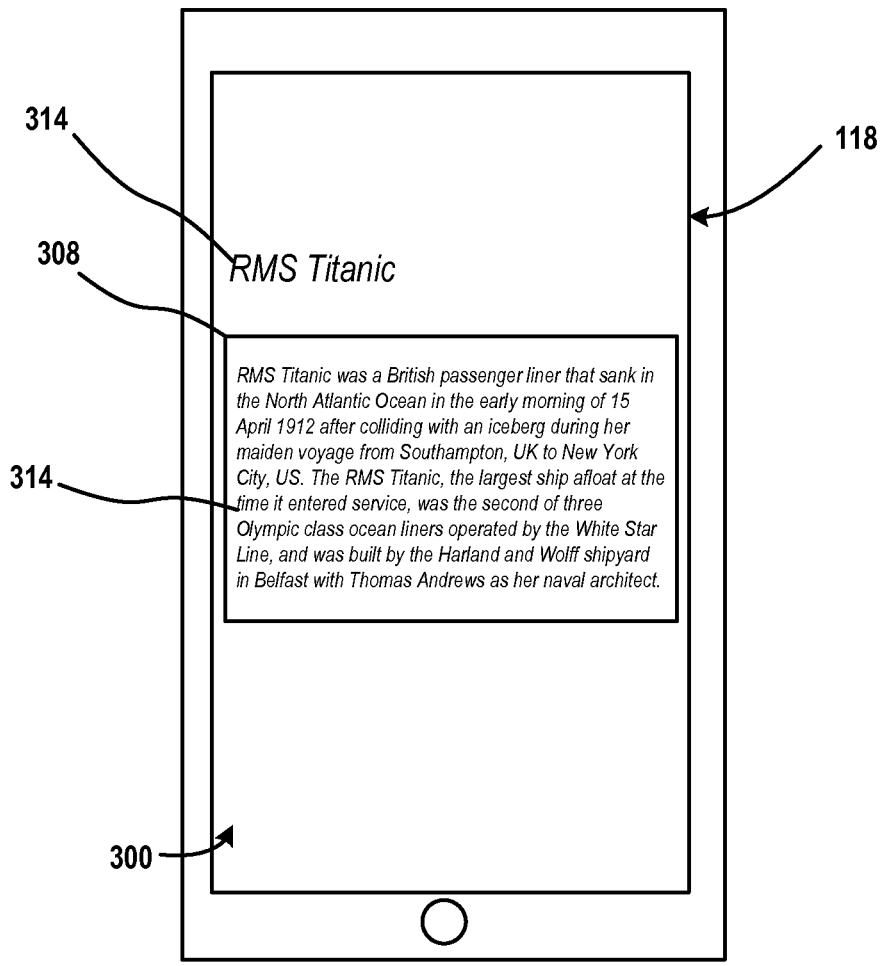
FIG. 3 illustrates an example of rendered content that may be processed by techniques described herein.

FIG. 3 illustrates an example of rendered content 300 that may be generated in operation 204. In this illustrative example, the rendered content 300 may be generated from a document 113 defining a formatting element 308, which may be in the form of a table, column or any other element having layout properties. In addition, the document 113 may include text 314. As shown, the text 314 may be arranged outside of the boundaries of the formatting element 308 and, at least in part, the text 314 may also be arranged within the boundaries of the formatting element 308.

Figure 4:
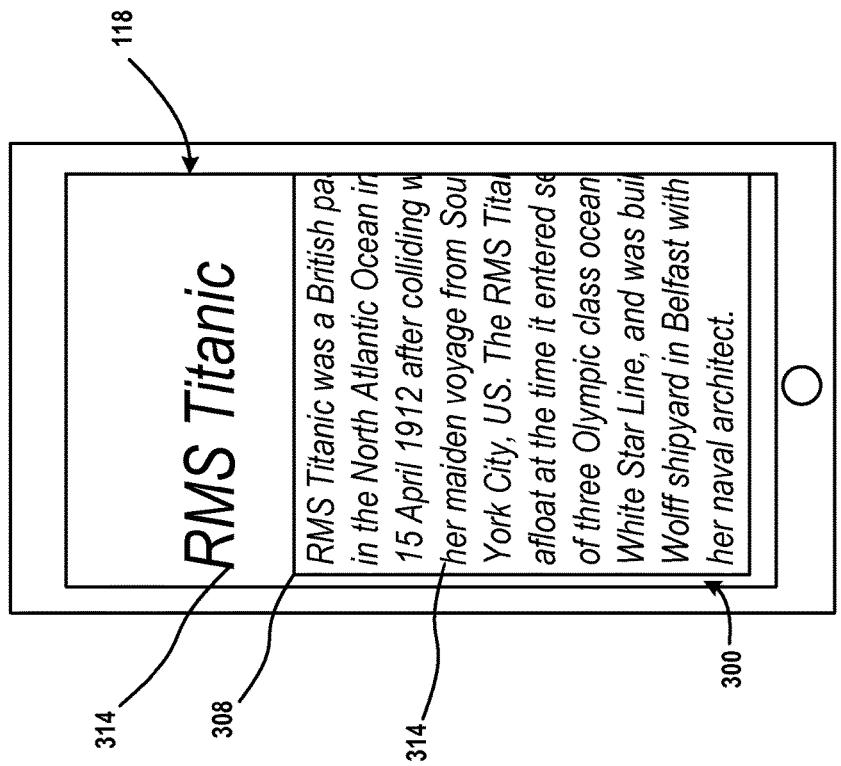
FIG. 4 illustrates a sample resulting output when the rendered content of FIG. 3 is scaled using a rendering scale factor.

FIG. 4 illustrates another example of the rendered content 300 that may result when a zoom command is received by the computing device. As shown in FIG. 4, when a rendering scale factor is applied to zoom into the document 113, the document elements, such as the text 314 and the formatting element 308, are larger than the rendering shown in FIG. 3. Also shown, when a rendering scale factor is used to zoom into the document 113, the result may not be optimal, as the size of one or more elements may not fit within a display port. In this illustrative example, the formatting element 308 containing the text 314 may be obscured by the boundaries of the display interface 118.

Figure 5:
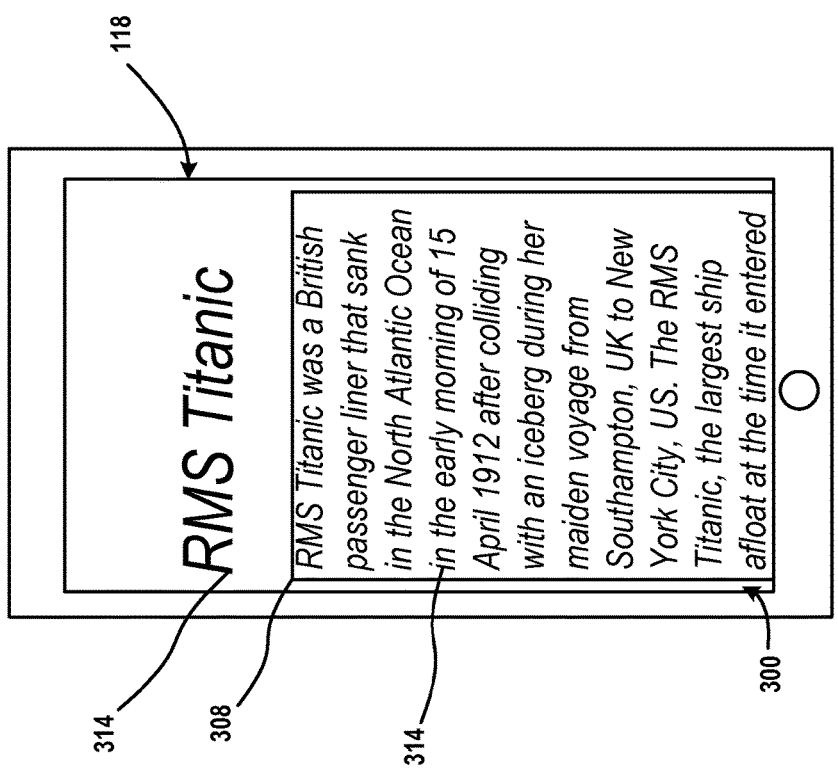
FIG. 5 illustrates a sample resulting output when a document defining the rendered content of FIG. 3 is processed by techniques described herein.

FIG. 5 illustrates yet another example of the rendered content 300 that may result when techniques described herein are applied to the document 113. In this illustrative example, a rendering scale factor is used to zoom into the document 113. Specifically, the formatting element 308 is selected by the use of one or more techniques described herein, and at least one dimension of the formatting element 308 is determined based on the rendering scale factor. As summarized above, in some configurations, a dimension of at least one element may be scaled based on an inverse of the rendering scale factor. In this example, the rendering scale factor indicates that the rendered content 300 is to be doubled in size, and the dimension of the formatting element 308 is reduced by a corresponding value, e.g., the determined width is half of the original width.

As shown in FIG. 5, the content of the document, such as the text 314, is enlarged as a result of the application of the rendering scale factor. In addition, because of the generated dimension of the formatting element 308, e.g., the width, is based on an inverse of the rendering scale factor, the formatting element 308 is reduced in size. As shown, by use of the techniques disclosed herein, the text 314 and the formatting element 308 are not obscured by the boundaries of the display interface 118. As can be appreciated, by applying techniques described herein, adjustments may be made to one or more elements to mitigate or eliminate the issues described above with respect to FIG. 4.

As summarized above, some configurations of the program module 111 may select certain elements of the document 113 based on one or more factors and/or contextual information. In addition, some configurations of the program module 111 may selectively apply the rendering scale factor to certain elements of the document 113 based on one or more factors and/or contextual information. In addition, the program module 111 may be configured to selectively apply a weighted or adjusted rendering scale factor to certain elements of the document 113. By allowing the program module 111 to selectively apply the rendering scale factor or a weighted rendering scale factor to certain elements, techniques described herein may produce an adjusted rendering that optimizes the quality of certain elements.

In some non-limiting examples, it can be appreciated that, in some scenarios, that the application of a rendering scale factor to increase the size of all elements of a document may be undesirable. For instance, it may be undesirable to increase the size of an image, as the quality of the image may be compromised if it is enlarged. Thus, techniques that selectively apply the rendering scale factor to certain elements, such as text, and allow other elements of a document to remain at their original size, or scale at a different rate, allows for a dynamic adjustment that optimizes the quality of the rendering. In addition to images, it may be undesirable to increase the size of certain elements or specific parameters of an element, such as a table border, as some elements may not have a desirable appearance when certain lines become too thick. By leaving images, certain elements or element layout parameters at their original size, or by applying a weighted rendering scale factor to such elements, the quality of images and/or other elements may be preserved. FIG. 6 and FIG. 7 illustrate an example rendering that result from such configurations.

Figure 6:
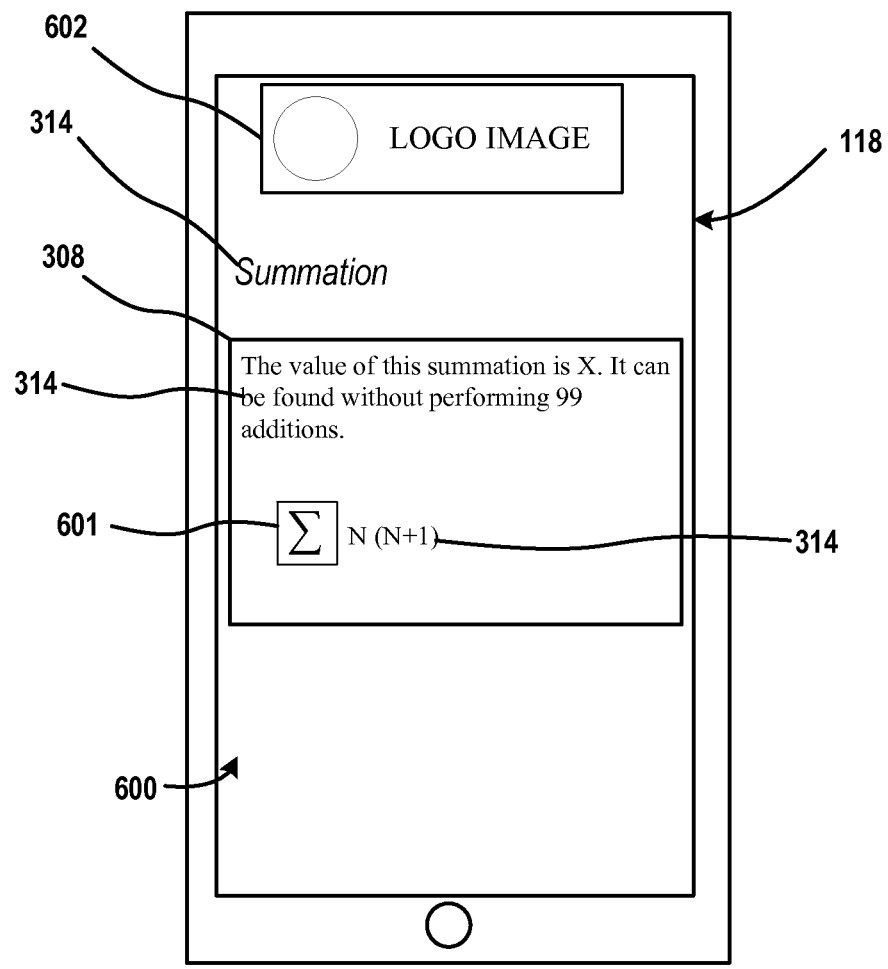
FIG. 6 illustrates an example rendering of another document containing two images to be processed by techniques described herein.

FIG. 6 illustrates an example of rendered content 600 that may be generated in operation 204 of the routine 200. In this illustrative example, the rendered content 600 may be generated from a document 113 defining a formatting element 308, which may be in the form of a table, column or any other element having layout properties. In addition, the document 113 may include text 314. As shown, a portion of the text 314 may be arranged outside the boundaries of the formatting element 308 and, at least in part, the text 314 may also be arranged within the boundaries of the formatting element 308. In addition, in this example, the document 113 includes a first image 601 of a mathematical symbol and a second image 602 of a logo.

FIG. 6 shows such a scenario where it may be desirable to selectively apply the rendering scale factor to the first image 601 of the mathematical symbol and apply a different rendering scale factor to other images, such as the second image 602 of the logo. As can be appreciated, selective application of the rendering scale factor may be helpful in such scenarios. For example, it may be desirable to optimize the quality of an image if the image contains graphical content, such as a logo or a picture of a person. Thus, it may not be desirable to apply a rendering scale factor to such images.

In other examples, it may be desirable to resize an image according to the rendering scale factor. FIG. 6 illustrates an example where the first image 601 of the mathematical symbol is aligned, graphically and/or contextually, with the text 314 of the document 113. As can be appreciated, since the contents of the first image 601 and the surrounding text 314 collectively communicate an expression, it may be desirable to adjust the size of the first image 601 in accordance with the size adjustment of the surrounding text 314. Thus, it may be desirable to apply a rendering scale factor, or a weighted rendering scale, to such images. By the use of known technologies for deriving and analyzing contextual information from images and text, the selective application of the rendering scale factor to certain elements may be achieved.

Figure 7:
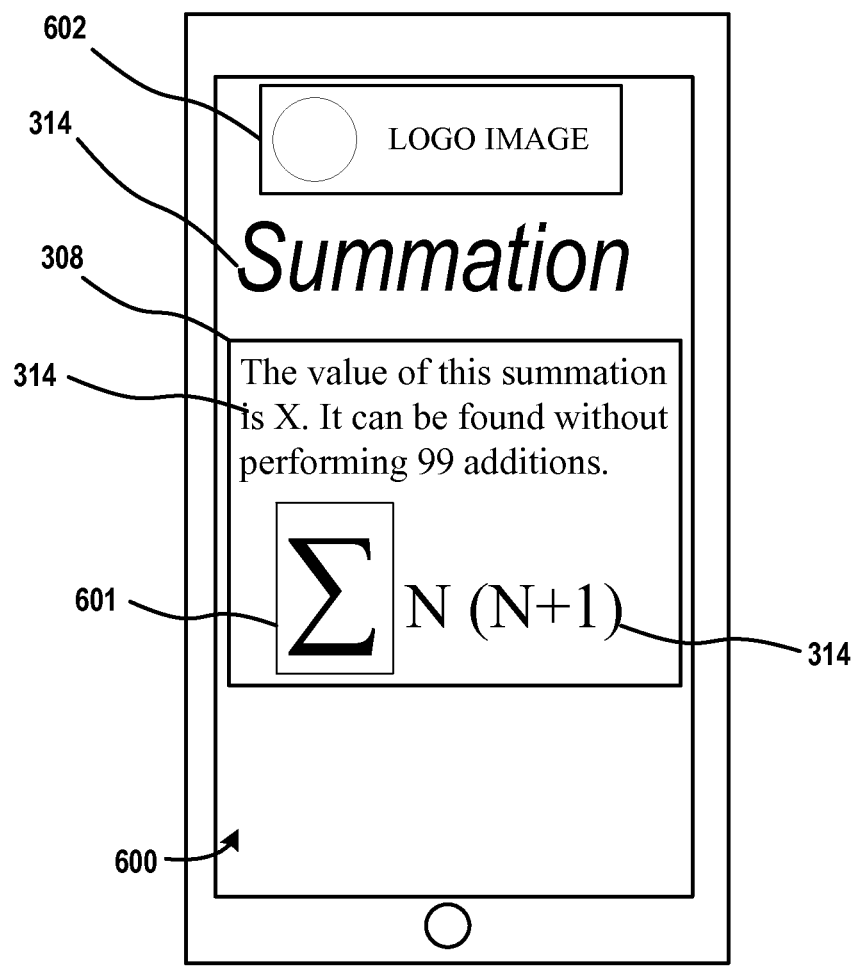
FIG. 7 illustrates a sample resulting output when a document defining the rendered content of FIG. 6 is processed by techniques described herein.

FIG. 7 illustrates an example of the rendered content 600 shown in FIG. 6 that may result when techniques described herein are applied to the document 113. In this illustrative example, a rendering scale factor is used to zoom into the rendered content 600. As shown in FIG. 7, when compared to the rendering shown in FIG. 6, the size of the text 314 is increased as a result of the rendering scale factor. In addition, the second image 602 remains at its original size. Also shown, the size of the first image 601 is increased as a result of the application of the rendering scale factor. It can be appreciated that such a result may be desired given the context of the document 113.

The result shown in FIG. 7 may be achieved in different ways. For example, in view of operation 208, certain elements may be selected to be resized. As described above, some configurations may select one or more elements and modify, determine or generate one or more dimensions for the selected elements. In addition, in view of operation 212, given that the program module 111 may selectively apply the rendering scale factor to various elements, certain elements may be scaled using one or more rendering scale factors and other elements may remain at their original size.

This example presented in FIGS. 6 and 7 is provided for illustrative purposes only and this example and other examples are not to be construed as limiting as it can be appreciated that a wide range of different scaling factors may be applied to many different elements depending on the context of the document and any other related contextual information. For example, the first image 601 may be scaled in accordance to the rendering scale factor, and the second image 602 may be scaled in accordance to another weighted value based on the rendering scale factor. As can be appreciated, the application of the rendering scale factor may be weighted differently for individual elements depending on one or more factors and or contextual information.

It can also be appreciated that different techniques may be used to adjust the size of one or more elements. Thus, although some of the examples described herein generate one or more dimensions of an element, any technique may be used to adjust the size of any selected element. In addition, although some configurations are described as applying different scaling factor to different selected elements, it can be appreciated that one or more selected elements may maintain an original size while other selected elements are scaled and/or resized.

Figure 8:
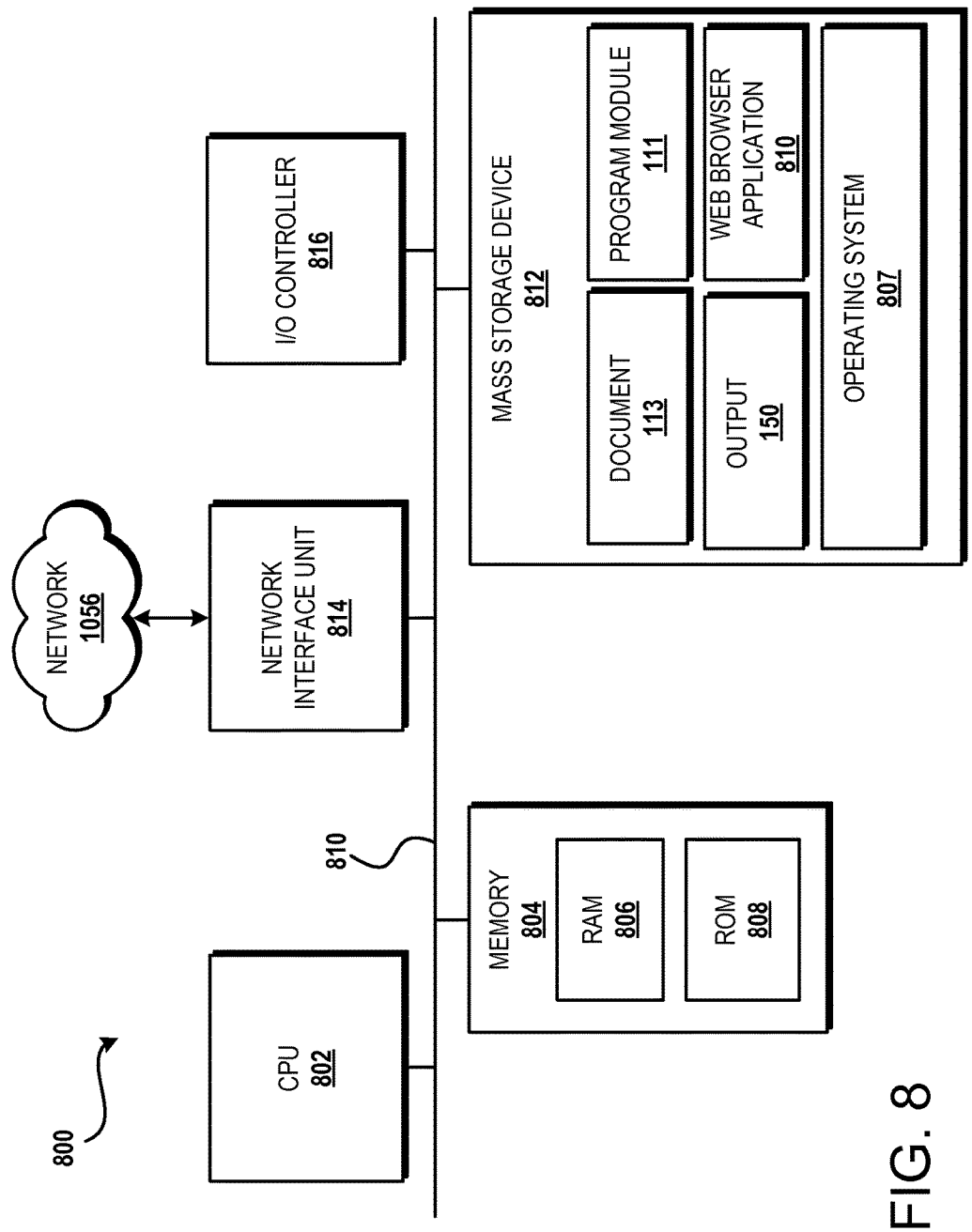
FIG. 8 is a computer architecture diagram illustrating an illustrative computer hardware and software architecture for a computing system capable of implementing aspects of the techniques and technologies presented herein.

FIG. 8 shows additional details of an example computer architecture 800 for a computer, such as the computing device 101 (FIG. 1), capable of executing the program components described above for providing dynamic adjustment of select elements of a document. Thus, the computer architecture 800 illustrated in FIG. 8 illustrates an architecture for a server computer, mobile phone, a PDA, a smart phone, a desktop computer, a netbook computer, a tablet computer, and/or a laptop computer. The computer architecture 800 may be utilized to execute any aspects of the software components presented herein.

The computer architecture 800 illustrated in FIG. 8 includes a central processing unit 802 ("CPU"), a system memory 804, including a random access memory 806 ("RAM") and a read-only memory ("ROM") 808, and a system bus 810 that couples the memory 804 to the CPU 802. A basic input/output system containing the basic routines that help to transfer information between elements within the computer architecture 800, such as during startup, is stored in the ROM 808. The computer architecture 800 further includes a mass storage device 812 for storing an operating system 807, and one or more application programs including, but not limited to, the web browser 810, program module 111, and a web browser application 810. The illustrated mass storage device 812 may also store a document 113, which may in any format containing any type of information that is accompanied with formatting data.

The mass storage device 812 is connected to the CPU 802 through a mass storage controller (not shown) connected to the bus 810. The mass storage device 812 and its associated computer-readable media provide non-volatile storage for the computer architecture 800. Although the description of computer-readable media contained herein refers to a mass storage device, such as a solid state drive, a hard disk or CD-ROM drive, it should be appreciated by those skilled in the art that computer-readable media can be any available computer storage media or communication media that can be accessed by the computer architecture 800.

Communication media includes computer readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

By way of example, and not limitation, computer storage media may include volatile and non-volatile, removable and non-removable media implemented in any method or technology for storage of information such as computer-readable instructions, data structures, program modules or other data. For example, computer media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computer architecture 800. For purposes the claims, the phrase "computer storage medium," "computer-readable storage medium" and variations thereof, does not include waves, signals, and/or other transitory and/or intangible communication media, per se.

According to various configurations, the computer architecture 800 may operate in a networked environment using logical connections to remote computers through the network 1056 and/or another network (not shown). The computer architecture 800 may connect to the network 1056 through a network interface unit 814 connected to the bus 810. It should be appreciated that the network interface unit 814 also may be utilized to connect to other types of networks and remote computer systems. The computer architecture 800 also may include an input/output controller 816 for receiving and processing input from a number of other devices, including a keyboard, mouse, or electronic stylus (not shown in FIG. 8). Similarly, the input/output controller 816 may provide output to a display screen, a printer, or other type of output device (also not shown in FIG. 8).

It should be appreciated that the software components described herein may, when loaded into the CPU 802 and executed, transform the CPU 802 and the overall computer architecture 800 from a general-purpose computing system into a special-purpose computing system customized to facilitate the functionality presented herein. The CPU 802 may be constructed from any number of transistors or other discrete circuit elements, which may individually or collectively assume any number of states. More specifically, the CPU 802 may operate as a finite-state machine, in response to executable instructions contained within the software modules disclosed herein. These computer-executable instructions may transform the CPU 802 by specifying how the CPU 802 transitions between states, thereby transforming the transistors or other discrete hardware elements constituting the CPU 802.

Encoding the software modules presented herein also may transform the physical structure of the computer-readable media presented herein. The specific transformation of physical structure may depend on various factors, in different implementations of this description. Examples of such factors may include, but are not limited to, the technology used to implement the computer-readable media, whether the computer-readable media is characterized as primary or secondary storage, and the like. For example, if the computer-readable media is implemented as semiconductor-based memory, the software disclosed herein may be encoded on the computer-readable media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the computer architecture 800 in order to store and execute the software components presented herein. It also should be appreciated that the computer architecture 800 may include other types of computing devices, including hand-held computers, embedded computer systems, personal digital assistants, and other types of computing devices known to those skilled in the art. It is also contemplated that the computer architecture 800 may not include all of the components shown in FIG. 8, may include other components that are not explicitly shown in FIG. 8, or may utilize an architecture completely different than that shown in FIG. 8.

Figure 9:
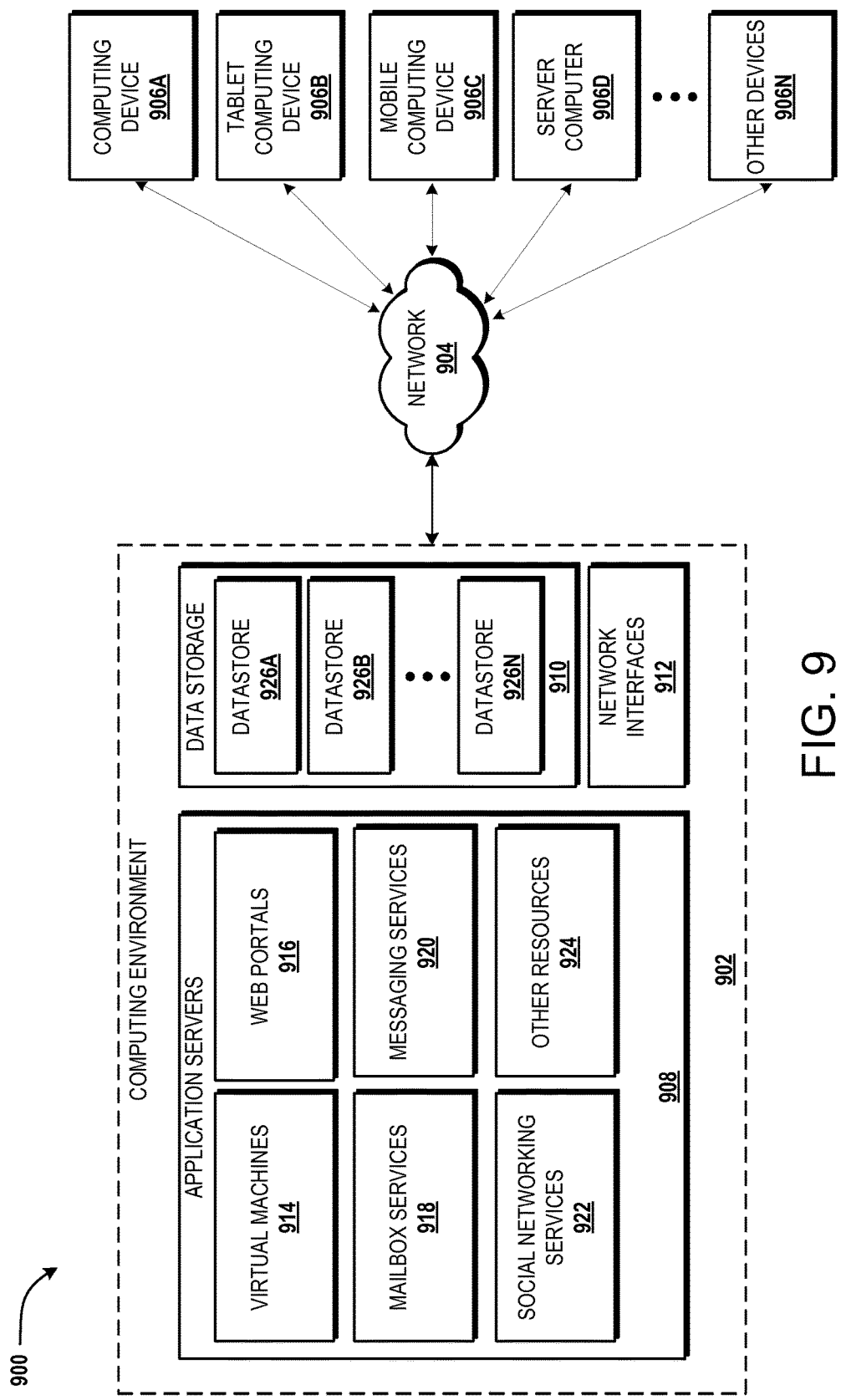
FIG. 9 is a diagram illustrating a distributed computing environment capable of implementing aspects of the techniques and technologies presented herein.

FIG. 9 depicts an illustrative distributed computing environment 900 capable of executing the software components described herein for providing dynamic adjustment of select elements of a document, among other aspects. Thus, the distributed computing environment 900 illustrated in FIG. 9 can be utilized to execute any aspects of the software components presented herein. For example, the distributed computing environment 900 can be utilized to execute aspects of the web browser 810, the program module 111 and/or other software components described herein.

According to various implementations, the distributed computing environment 900 includes a computing environment 902 operating on, in communication with, or as part of the network 904. The network 904 may be or may include the network 1056, described above with reference to FIG. 8. The network 904 also can include various access networks. One or more client devices 906A-906N (hereinafter referred to collectively and/or generically as "clients 906") can communicate with the computing environment 902 via the network 904 and/or other connections (not illustrated in FIG. 9). In one illustrated configuration, the clients 906 include a computing device 906A such as a laptop computer, a desktop computer, or other computing device; a slate or tablet computing device ("tablet computing device") 906B; a mobile computing device 906C such as a mobile telephone, a smart phone, or other mobile computing device; a server computer 906D; and/or other devices 906N. It should be understood that any number of clients 906 can communicate with the computing environment 902. Two example computing architectures for the clients 906 are illustrated and described herein with reference to FIGS. 8 and 10. It should be understood that the illustrated clients 906 and computing architectures illustrated and described herein are illustrative, and should not be construed as being limited in any way.

In the illustrated configuration, the computing environment 902 includes application servers 908, data storage 910, and one or more network interfaces 912. According to various implementations, the functionality of the application servers 908 can be provided by one or more server computers that are executing as part of, or in communication with, the network 904. The application servers 908 can host various services, virtual machines, portals, and/or other resources. In the illustrated configuration, the application servers 908 host one or more virtual machines 914 for hosting applications or other functionality. According to various implementations, the virtual machines 914 host one or more applications and/or software modules for providing dynamic adjustment of select elements of a document. It should be understood that this configuration is illustrative, and should not be construed as being limiting in any way. The application servers 908 also host or provide access to one or more portals, link pages, Web sites, and/or other information ("Web portals") 916.

According to various implementations, the application servers 908 also include one or more mailbox services 918 and one or more messaging services 920. The mailbox services 918 can include electronic mail ("email") services. The mailbox services 918 also can include various personal information management ("PIM") services including, but not limited to, calendar services, contact management services, collaboration services, and/or other services. The messaging services 920 can include, but are not limited to, instant messaging services, chat services, forum services, and/or other communication services.

The application servers 908 also may include one or more social networking services 922. The social networking services 922 can include various social networking services including, but not limited to, services for sharing or posting status updates, instant messages, links, photos, videos, and/or other information; services for commenting or displaying interest in articles, products, blogs, or other resources; and/or other services. In some configurations, the social networking services 922 are provided by or include the FACEBOOK social networking service, the LINKEDIN professional networking service, the MYSPACE social networking service, the FOURSQUARE geographic networking service, the YAMMER office colleague networking service, and the like. In other configurations, the social networking services 922 are provided by other services, sites, and/or providers that may or may not be explicitly known as social networking providers. For example, some web sites allow users to interact with one another via email, chat services, and/or other means during various activities and/or contexts such as reading published articles, commenting on goods or services, publishing, collaboration, gaming, and the like. Examples of such services include, but are not limited to, the WINDOWS LIVE service and the XBOX LIVE service from Microsoft Corporation in Redmond, Wash. Other services are possible and are contemplated.

The social networking services 922 also can include commenting, blogging, and/or micro blogging services. Examples of such services include, but are not limited to, the YELP commenting service, the KUDZU review service, the OFFICETALK enterprise micro blogging service, the TWITTER messaging service, the GOOGLE BUZZ service, and/or other services. It should be appreciated that the above lists of services are not exhaustive and that numerous additional and/or alternative social networking services 922 are not mentioned herein for the sake of brevity. As such, the above configurations are illustrative, and should not be construed as being limited in any way. According to various implementations, the social networking services 922 may host one or more applications and/or software modules for providing the functionality described herein for providing dynamic adjustment of select elements of a document. For instance, any one of the application servers 908 may communicate or facilitate the functionality and features described herein. For instance, a social networking application, mail client, messaging client or a browser running on a phone or any other client 906 may communicate with a networking service 922 and facilitate the functionality, even in part, described above with respect to FIG. 2.

As shown in FIG. 9, the application servers 908 also can host other services, applications, portals, and/or other resources ("other resources") 924. The other resources 924 can include, but are not limited to, document sharing, rendering or any other functionality. It thus can be appreciated that the computing environment 902 can provide integration of the concepts and technologies disclosed herein provided herein with various mailbox, messaging, social networking, and/or other services or resources.

As mentioned above, the computing environment 902 can include the data storage 910. According to various implementations, the functionality of the data storage 910 is provided by one or more databases operating on, or in communication with, the network 904. The functionality of the data storage 910 also can be provided by one or more server computers configured to host data for the computing environment 902. The data storage 910 can include, host, or provide one or more real or virtual datastores 926A-926N (hereinafter referred to collectively and/or generically as "datastores 926"). The datastores 926 are configured to host data used or created by the application servers 908 and/or other data. Although not illustrated in FIG. 9, the datastores 926 also can host or store web page documents, word documents, presentation documents, data structures, algorithms for execution by a recommendation engine, and/or other data utilized by any application program or another module, such as the program module 111. Aspects of the datastores 926 may be associated with a service for storing files.

The computing environment 902 can communicate with, or be accessed by, the network interfaces 912. The network interfaces 912 can include various types of network hardware and software for supporting communications between two or more computing devices including, but not limited to, the clients 906 and the application servers 908. It should be appreciated that the network interfaces 912 also may be utilized to connect to other types of networks and/or computer systems.

It should be understood that the distributed computing environment 900 described herein can provide any aspects of the software elements described herein with any number of virtual computing resources and/or other distributed computing functionality that can be configured to execute any aspects of the software components disclosed herein. According to various implementations of the concepts and technologies disclosed herein, the distributed computing environment 900 provides the software functionality described herein as a service to the clients 906. It should be understood that the clients 906 can include real or virtual machines including, but not limited to, server computers, web servers, personal computers, mobile computing devices, smart phones, and/or other devices. As such, various configurations of the concepts and technologies disclosed herein enable any device configured to access the distributed computing environment 900 to utilize the functionality described herein for providing dynamic adjustment of select elements of a document, among other aspects. In one specific example, as summarized above, techniques described herein may be implemented, at least in part, by the web browser application 810 of FIG. 8, which works in conjunction with the application servers 908 of FIG. 9.

Turning now to FIG. 10, an illustrative computing device architecture 1000 for a computing device that is capable of executing various software components described herein for providing dynamic adjustment of select elements of a document. The computing device architecture 1000 is applicable to computing devices that facilitate mobile computing due, in part, to form factor, wireless connectivity, and/or battery-powered operation. In some configurations, the computing devices include, but are not limited to, mobile telephones, tablet devices, slate devices, portable video game devices, and the like. The computing device architecture 1000 is applicable to any of the clients 906 shown in FIG. 9. Moreover, aspects of the computing device architecture 1000 may be applicable to traditional desktop computers, portable computers (e.g., laptops, notebooks, ultra-portables, and netbooks), server computers, and other computer systems, such as described herein with reference to FIG. 8. For example, the single touch and multi-touch aspects disclosed herein below may be applied to desktop computers that utilize a touchscreen or some other touch-enabled device, such as a touch-enabled track pad or touch-enabled mouse.

The computing device architecture 1000 illustrated in FIG. 10 includes a processor 1002, memory components 1004, network connectivity components 1006, sensor components 1008, input/output components 1010, and power components 1012. In the illustrated configuration, the processor 1002 is in communication with the memory components 1004, the network connectivity components 1006, the sensor components 1008, the input/output ("I/O") components 1010, and the power components 1012. Although no connections are shown between the individuals components illustrated in FIG. 10, the components can interact to carry out device functions. In some configurations, the components are arranged so as to communicate via one or more busses (not shown).

The processor 1002 includes a central processing unit ("CPU") configured to process data, execute computer-executable instructions of one or more application programs, and communicate with other components of the computing device architecture 1000 in order to perform various functionality described herein. The processor 1002 may be utilized to execute aspects of the software components presented herein and, particularly, those that utilize, at least in part, a touch-enabled input.

In some configurations, the processor 1002 includes a graphics processing unit ("GPU") configured to accelerate operations performed by the CPU, including, but not limited to, operations performed by executing general-purpose scientific and/or engineering computing applications, as well as graphics-intensive computing applications such as high resolution video (e.g., 720P, 1080P, and higher resolution), video games, three-dimensional ("3D") modeling applications, and the like. In some configurations, the processor 1002 is configured to communicate with a discrete GPU (not shown). In any case, the CPU and GPU may be configured in accordance with a co-processing CPU/GPU computing model, wherein the sequential part of an application executes on the CPU and the computationally-intensive part is accelerated by the GPU.

In some configurations, the processor 1002 is, or is included in, a system-on-chip ("SoC") along with one or more of the other components described herein below. For example, the SoC may include the processor 1002, a GPU, one or more of the network connectivity components 1006, and one or more of the sensor components 1008. In some configurations, the processor 1002 is fabricated, in part, utilizing a package-on-package ("PoP") integrated circuit packaging technique. The processor 1002 may be a single core or multi-core processor.

The processor 1002 may be created in accordance with an ARM architecture, available for license from ARM HOLDINGS of Cambridge, United Kingdom. Alternatively, the processor 1002 may be created in accordance with an x86 architecture, such as is available from INTEL CORPORATION of Mountain View, Calif. and others. In some configurations, the processor 1002 is a SNAPDRAGON SoC, available from QUALCOMM of San Diego, Calif., a TEGRA SoC, available from NVIDIA of Santa Clara, Calif., a HUMMINGBIRD SoC, available from SAMSUNG of Seoul, South Korea, an Open Multimedia Application Platform ("OMAP") SoC, available from TEXAS INSTRUMENTS of Dallas, Tex., a customized version of any of the above SoCs, or a proprietary SoC.

The memory components 1004 include a random access memory ("RAM") 1014, a read-only memory ("ROM") 1016, an integrated storage memory ("integrated storage") 1018, and a removable storage memory ("removable storage") 1020. In some configurations, the RAM 1014 or a portion thereof, the ROM 1016 or a portion thereof, and/or some combination the RAM 1014 and the ROM 1016 is integrated in the processor 1002. In some configurations, the ROM 1016 is configured to store a firmware, an operating system or a portion thereof (e.g., operating system kernel), and/or a bootloader to load an operating system kernel from the integrated storage 1018 and/or the removable storage 1020.

The integrated storage 1018 can include a solid-state memory, a hard disk, or a combination of solid-state memory and a hard disk. The integrated storage 1018 may be soldered or otherwise connected to a logic board upon which the processor 1002 and other components described herein also may be connected. As such, the integrated storage 1018 is integrated in the computing device. The integrated storage 1018 is configured to store an operating system or portions thereof, application programs, data, and other software components described herein.

The removable storage 1020 can include a solid-state memory, a hard disk, or a combination of solid-state memory and a hard disk. In some configurations, the removable storage 1020 is provided in lieu of the integrated storage 1018. In other configurations, the removable storage 1020 is provided as additional optional storage. In some configurations, the removable storage 1020 is logically combined with the integrated storage 1018 such that the total available storage is made available as a total combined storage capacity. In some configurations, the total combined capacity of the integrated storage 1018 and the removable storage 1020 is shown to a user instead of separate storage capacities for the integrated storage 1018 and the removable storage 1020.

The removable storage 1020 is configured to be inserted into a removable storage memory slot (not shown) or other mechanism by which the removable storage 1020 is inserted and secured to facilitate a connection over which the removable storage 1020 can communicate with other components of the computing device, such as the processor 1002. The removable storage 1020 may be embodied in various memory card formats including, but not limited to, PC card, CompactFlash card, memory stick, secure digital ("SD"), miniSD, microSD, universal integrated circuit card ("UICC") (e.g., a subscriber identity module ("SIM") or universal SIM ("USIM")), a proprietary format, or the like.

It can be understood that one or more of the memory components 1004 can store an operating system. According to various configurations, the operating system includes, but is not limited to WINDOWS MOBILE OS from Microsoft Corporation of Redmond, Wash., WINDOWS PHONE OS from Microsoft Corporation, WINDOWS from Microsoft Corporation, PALM WEBOS from Hewlett-Packard Company of Palo Alto, Calif., BLACKBERRY OS from Research In Motion Limited of Waterloo, Ontario, Canada, IOS from Apple Inc. of Cupertino, Calif., and ANDROID OS from Google Inc. of Mountain View, Calif. Other operating systems are contemplated.

The network connectivity components 1006 include a wireless wide area network component ("WWAN component") 1022, a wireless local area network component ("WLAN component") 1024, and a wireless personal area network component ("WPAN component") 1026. The network connectivity components 1006 facilitate communications to and from the network 1056 or another network, which may be a WWAN, a WLAN, or a WPAN. Although only the network 1056 is illustrated, the network connectivity components 1006 may facilitate simultaneous communication with multiple networks, including the network 904 of FIG. 9. For example, the network connectivity components 1006 may facilitate simultaneous communications with multiple networks via one or more of a WWAN, a WLAN, or a WPAN.

The network 1056 may be or may include a WWAN, such as a mobile telecommunications network utilizing one or more mobile telecommunications technologies to provide voice and/or data services to a computing device utilizing the computing device architecture 1000 via the WWAN component 1022. The mobile telecommunications technologies can include, but are not limited to, Global System for Mobile communications ("GSM"), Code Division Multiple Access ("CDMA") ONE, CDMA2000, Universal Mobile Telecommunications System ("UMTS"), Long Term Evolution ("LTE"), and Worldwide Interoperability for Microwave Access ("WiMAX"). Moreover, the network 1056 may utilize various channel access methods (which may or may not be used by the aforementioned standards) including, but not limited to, Time Division Multiple Access ("TDMA"), Frequency Division Multiple Access ("FDMA"), CDMA, wideband CDMA ("W-CDMA"), Orthogonal Frequency Division Multiplexing ("OFDM"), Space Division Multiple Access ("SDMA"), and the like. Data communications may be provided using General Packet Radio Service ("GPRS"), Enhanced Data rates for Global Evolution ("EDGE"), the High-Speed Packet Access ("HSPA") protocol family including High-Speed Downlink Packet Access ("HSDPA"), Enhanced Uplink ("EUL") or otherwise termed High-Speed Uplink Packet Access ("HSUPA"), Evolved HSPA ("HSPA+"), LTE, and various other current and future wireless data access standards. The network 104 may be configured to provide voice and/or data communications with any combination of the above technologies. The network 1056 may be configured to or adapted to provide voice and/or data communications in accordance with future generation technologies.

In some configurations, the WWAN component 1022 is configured to provide dual-multi-mode connectivity to the network 1056. For example, the WWAN component 1022 may be configured to provide connectivity to the network 1056, wherein the network 1056 provides service via GSM and UMTS technologies, or via some other combination of technologies. Alternatively, multiple WWAN components 1022 may be utilized to perform such functionality, and/or provide additional functionality to support other non-compatible technologies (i.e., incapable of being supported by a single WWAN component). The WWAN component 1022 may facilitate similar connectivity to multiple networks (e.g., a UMTS network and an LTE network).

The network 1056 may be a WLAN operating in accordance with one or more Institute of Electrical and Electronic Engineers ("IEEE") 802.11 standards, such as IEEE 802.11a, 802.11b, 802.11g, 802.11n, and/or future 802.11 standard (referred to herein collectively as WI-FI). Draft 802.11 standards are also contemplated. In some configurations, the WLAN is implemented utilizing one or more wireless WI-FI access points. In some configurations, one or more of the wireless WI-FI access points are another computing device with connectivity to a WWAN that are functioning as a WI-FI hotspot. The WLAN component 1024 is configured to connect to the network 1056 via the WI-FI access points. Such connections may be secured via various encryption technologies including, but not limited, WI-FI Protected Access ("WPA"), WPA2, Wired Equivalent Privacy ("WEP"), and the like.

The network 1056 may be a WPAN operating in accordance with Infrared Data Association ("IrDA"), BLUETOOTH, wireless Universal Serial Bus ("USB"), Z-Wave, ZIGBEE, or some other short-range wireless technology. In some configurations, the WPAN component 1026 is configured to facilitate communications with other devices, such as peripherals, computers, or other computing devices via the WPAN.

The sensor components 1008 include a magnetometer 1028, an ambient light sensor 1030, a proximity sensor 1032, an accelerometer 1034, a gyroscope 1036, and a Global Positioning System sensor ("GPS sensor") 1038. It is contemplated that other sensors, such as, but not limited to, temperature sensors or shock detection sensors, also may be incorporated in the computing device architecture 1000.

The magnetometer 1028 is configured to measure the strength and direction of a magnetic field. In some configurations the magnetometer 1028 provides measurements to a compass application program stored within one of the memory components 1004 in order to provide a user with accurate directions in a frame of reference including the cardinal directions, north, south, east, and west. Similar measurements may be provided to a navigation application program that includes a compass component. Other uses of measurements obtained by the magnetometer 1028 are contemplated.

The ambient light sensor 1030 is configured to measure ambient light. In some configurations, the ambient light sensor 1030 provides measurements to an application program stored within one the memory components 1004 in order to automatically adjust the brightness of a display (described below) to compensate for low-light and high-light environments. Other uses of measurements obtained by the ambient light sensor 1030 are contemplated.

The proximity sensor 1032 is configured to detect the presence of an object or thing in proximity to the computing device without direct contact. In some configurations, the proximity sensor 1032 detects the presence of a user's body (e.g., the user's face) and provides this information to an application program stored within one of the memory components 1004 that utilizes the proximity information to enable or disable some functionality of the computing device. For example, a telephone application program may automatically disable a touchscreen (described below) in response to receiving the proximity information so that the user's face does not inadvertently end a call or enable/disable other functionality within the telephone application program during the call. Other uses of proximity as detected by the proximity sensor 1032 are contemplated.

The accelerometer 1034 is configured to measure proper acceleration. In some configurations, output from the accelerometer 1034 is used by an application program as an input mechanism to control some functionality of the application program. For example, the application program may be a video game in which a character, a portion thereof, or an object is moved or otherwise manipulated in response to input received via the accelerometer 1034. In some configurations, output from the accelerometer 1034 is provided to an application program for use in switching between landscape and portrait modes, calculating coordinate acceleration, or detecting a fall. Other uses of the accelerometer 1034 are contemplated.

The gyroscope 1036 is configured to measure and maintain orientation. In some configurations, output from the gyroscope 1036 is used by an application program as an input mechanism to control some functionality of the application program. For example, the gyroscope 1036 can be used for accurate recognition of movement within a 3D environment of a video game application or some other application. In some configurations, an application program utilizes output from the gyroscope 1036 and the accelerometer 1034 to enhance control of some functionality of the application program. Other uses of the gyroscope 1036 are contemplated.

The GPS sensor 1038 is configured to receive signals from GPS satellites for use in calculating a location. The location calculated by the GPS sensor 1038 may be used by any application program that requires or benefits from location information. For example, the location calculated by the GPS sensor 1038 may be used with a navigation application program to provide directions from the location to a destination or directions from the destination to the location. Moreover, the GPS sensor 1038 may be used to provide location information to an external location-based service, such as E911 service. The GPS sensor 1038 may obtain location information generated via WI-FI, WIMAX, and/or cellular triangulation techniques utilizing one or more of the network connectivity components 1006 to aid the GPS sensor 1038 in obtaining a location fix. The GPS sensor 1038 may also be used in Assisted GPS ("A-GPS") systems.

The I/O components 1010 include a display 1040, a touchscreen 1042, a data I/O interface component ("data I/O") 1044, an audio I/O interface component ("audio I/O") 1046, a video I/O interface component ("video I/O") 1048, and a camera 1050. In some configurations, the display 1040 and the touchscreen 1042 are combined. In some configurations two or more of the data I/O component 1044, the audio I/O component 1046, and the video I/O component 1048 are combined. The I/O components 1010 may include discrete processors configured to support the various interface described below, or may include processing functionality built-in to the processor 1002.

The display 1040 is an output device configured to present information in a visual form. In particular, the display 1040 may present graphical user interface ("GUI") elements, text, images, video, notifications, virtual buttons, virtual keyboards, messaging data, Internet content, device status, time, date, calendar data, preferences, map information, location information, and any other information that is capable of being presented in a visual form. In some configurations, the display 1040 is a liquid crystal display ("LCD") utilizing any active or passive matrix technology and any backlighting technology (if used). In some configurations, the display 1040 is an organic light emitting diode ("OLED") display. Other display types are contemplated.

The touchscreen 1042, also referred to herein as a "touch-enabled screen," is an input device configured to detect the presence and location of a touch. The touchscreen 1042 may be a resistive touchscreen, a capacitive touchscreen, a surface acoustic wave touchscreen, an infrared touchscreen, an optical imaging touchscreen, a dispersive signal touchscreen, an acoustic pulse recognition touchscreen, or may utilize any other touchscreen technology. In some configurations, the touchscreen 1042 is incorporated on top of the display 1040 as a transparent layer to enable a user to use one or more touches to interact with objects or other information presented on the display 1040. In other configurations, the touchscreen 1042 is a touch pad incorporated on a surface of the computing device that does not include the display 1040. For example, the computing device may have a touchscreen incorporated on top of the display 1040 and a touch pad on a surface opposite the display 1040.

In some configurations, the touchscreen 1042 is a single-touch touchscreen. In other configurations, the touchscreen 1042 is a multi-touch touchscreen. In some configurations, the touchscreen 1042 is configured to detect discrete touches, single touch gestures, and/or multi-touch gestures. These are collectively referred to herein as gestures for convenience. Several gestures will now be described. It should be understood that these gestures are illustrative and are not intended to limit the scope of the appended claims. Moreover, the described gestures, additional gestures, and/or alternative gestures may be implemented in software for use with the touchscreen 1042. As such, a developer may create gestures that are specific to a particular application program.

In some configurations, the touchscreen 1042 supports a tap gesture in which a user taps the touchscreen 1042 once on an item presented on the display 1040. The tap gesture may be used for various reasons including, but not limited to, opening or launching whatever the user taps. In some configurations, the touchscreen 1042 supports a double tap gesture in which a user taps the touchscreen 1042 twice on an item presented on the display 1040. The double tap gesture may be used for various reasons including, but not limited to, zooming in or zooming out in stages. In some configurations, the touchscreen 1042 supports a tap and hold gesture in which a user taps the touchscreen 1042 and maintains contact for at least a pre-defined time. The tap and hold gesture may be used for various reasons including, but not limited to, opening a context-specific menu.

In some configurations, the touchscreen 1042 supports a pan gesture in which a user places a finger on the touchscreen 1042 and maintains contact with the touchscreen 1042 while moving the finger on the touchscreen 1042. The pan gesture may be used for various reasons including, but not limited to, moving through screens, images, or menus at a controlled rate. Multiple finger pan gestures are also contemplated. In some configurations, the touchscreen 1042 supports a flick gesture in which a user swipes a finger in the direction the user wants the screen to move. The flick gesture may be used for various reasons including, but not limited to, scrolling horizontally or vertically through menus or pages. In some configurations, the touchscreen 1042 supports a pinch and stretch gesture in which a user makes a pinching motion with two fingers (e.g., thumb and forefinger) on the touchscreen 1042 or moves the two fingers apart. The pinch and stretch gesture may be used for various reasons including, but not limited to, zooming gradually in or out of a website, map, or picture.

Although the above gestures have been described with reference to the use one or more fingers for performing the gestures, other appendages such as toes or objects such as styluses may be used to interact with the touchscreen 1042. As such, the above gestures should be understood as being illustrative and should not be construed as being limiting in any way.

The data I/O interface component 1044 is configured to facilitate input of data to the computing device and output of data from the computing device. In some configurations, the data I/O interface component 1044 includes a connector configured to provide wired connectivity between the computing device and a computer system, for example, for synchronization operation purposes. The connector may be a proprietary connector or a standardized connector such as USB, micro-USB, mini-USB, or the like. In some configurations, the connector is a dock connector for docking the computing device with another device such as a docking station, audio device (e.g., a digital music player), or video device.

The audio I/O interface component 1046 is configured to provide audio input and/or output capabilities to the computing device. In some configurations, the audio I/O interface component 1046 includes a microphone configured to collect audio signals. In some configurations, the audio I/O interface component 1046 includes a headphone jack configured to provide connectivity for headphones or other external speakers. In some configurations, the audio I/O interface component 1046 includes a speaker for the output of audio signals. In some configurations, the audio I/O interface component 1046 includes an optical audio cable out.

The video I/O interface component 1048 is configured to provide video input and/or output capabilities to the computing device. In some configurations, the video I/O interface component 1048 includes a video connector configured to receive video as input from another device (e.g., a video media player such as a DVD or BLURAY player) or send video as output to another device (e.g., a monitor, a television, or some other external display). In some configurations, the video I/O interface component 1048 includes a High-Definition Multimedia Interface ("HDMI"), mini-HDMI, micro-HDMI, DisplayPort, or proprietary connector to input/output video content. In some configurations, the video I/O interface component 1048 or portions thereof is combined with the audio I/O interface component 1046 or portions thereof.

The camera 1050 can be configured to capture still images and/or video. The camera 1050 may utilize a charge coupled device ("CCD") or a complementary metal oxide semiconductor ("CMOS") image sensor to capture images. In some configurations, the camera 1050 includes a flash to aid in taking pictures in low-light environments. Settings for the camera 1050 may be implemented as hardware or software buttons.

Although not illustrated, one or more hardware buttons may also be included in the computing device architecture 1000. The hardware buttons may be used for controlling some operational aspect of the computing device. The hardware buttons may be dedicated buttons or multi-use buttons. The hardware buttons may be mechanical or sensor-based.

The illustrated power components 1012 include one or more batteries 1052, which can be connected to a battery gauge 1054. The batteries 1052 may be rechargeable or disposable. Rechargeable battery types include, but are not limited to, lithium polymer, lithium ion, nickel cadmium, and nickel metal hydride. Each of the batteries 1052 may be made of one or more cells.

The battery gauge 1054 can be configured to measure battery parameters such as current, voltage, and temperature. In some configurations, the battery gauge 1054 is configured to measure the effect of a battery's discharge rate, temperature, age and other factors to predict remaining life within a certain percentage of error. In some configurations, the battery gauge 1054 provides measurements to an application program that is configured to utilize the measurements to present useful power management data to a user. Power management data may include one or more of a percentage of battery used, a percentage of battery remaining, a battery condition, a remaining time, a remaining capacity (e.g., in watt hours), a current draw, and a voltage.

The power components 1012 may also include a power connector, which may be combined with one or more of the aforementioned I/O components 1010. The power components 1012 may interface with an external power system or charging equipment via an I/O component.

The disclosure presented herein may be considered in view of the following clauses.

Clause 1: A computer-implemented example, the method comprising: rendering, at a computing device, a document including an element; receiving a command to apply a rendering scale factor to the document; determining at least one dimension associated with the element of the document based on the rendering scale factor; and rendering the document based on the rendering scale factor, wherein the rendering of the document utilizes the least one dimension associated with the element.

Clause 2: The example of clause 1, wherein the at least one dimension is determined based on an inverse of the rendering scale factor.

Clause 3: The example of clauses 1-2, wherein determining the at least one dimension comprises: determining contextual information associated with the element; determining a weight that is based on the contextual information and an inverse of the rendering scale factor; and determining the at least one dimension based on the weight.

Clause 4: The example of clauses 1-3, wherein the document comprises an image, and wherein rendering the document comprises: determining contextual information associated with the image; determining if the rendering scale factor is to be applied to the image based on the contextual information; and applying the rendering scale factor to the image if it is determined that the rendering scale factor is to be applied to the image.

Clause 5: The example of clauses 1-4, wherein the document comprises an image, and wherein rendering the document comprises: determining contextual information associated with the image; determining a weighted rendering scale factor based on the rendering scale factor and the contextual information associated with the image; and applying the weighted rendering scale factor to the image.

Clause 6: The example of clauses 1-5, wherein the document comprises a first image and a second image, and wherein rendering the document comprises: determining contextual information associated with the first image; determining contextual information associated with the second image; applying the rendering scale factor to the first image based on the contextual information associated with the first image; and applying a weighted rendering scale factor to the second image based on the contextual information associated with the second image.

Clause 7: A computer, including a processor; and a computer-readable storage medium in communication with the processor, the computer-readable storage medium having computer-executable instructions stored thereupon which, when executed by the processor, cause the computer to render a document including a plurality of elements, receive a command to apply a rendering scale factor to the document, select at least one element from the plurality of elements, determine at least one dimension associated with the at least one element based on the rendering scale factor, and render the document utilizing the at least one dimension associated with the at least one element.

Clause 8: The computer of clause 7, wherein the at least one element from the plurality of elements is selected based on a data type of the at least one element.

Clause 9: The computer of clauses 7-8, wherein the at least one element from the plurality of elements is selected based on contextual information associated with the at least one element.

Clause 10: The computer of clauses 7-9, wherein the at least one element from the plurality of elements is selected based on a data type of the at least one element and an arrangement of other elements of the plurality of elements.

Clause 11: The computer of clauses 7-10, wherein the at least one dimension is determined based on an inverse of the rendering scale factor.

Clause 12: The computer of clauses 7-11, wherein determining the at least one dimension comprises: determining contextual information associated with the element; determining a weight that is based on the contextual information and an inverse of the rendering scale factor; and determining the at least one dimension based on the weight.

Clause 13: The computer of clauses 7-12, wherein the document comprises an image, and wherein rendering the document utilizing the at least one dimension associated with the at least one element, comprises: determining contextual information associated with the image; determining if the rendering scale factor is to be applied to the image based on the contextual information; and applying the rendering scale factor to the image if it is determined that the rendering scale factor is to be applied to the image.

Clause 14: The computer of clauses 7-13, wherein the document comprises an image, and wherein rendering the document utilizing the at least one dimension associated with the at least one element, comprises: determining contextual information associated with the image; determining a weighted rendering scale factor based on the rendering scale factor and the contextual information associated with the image; and applying the weighted rendering scale factor to the image.

Clause 15: The computer of clauses 7-14, wherein the document comprises a first image and a second image, and wherein rendering the document utilizing the at least one dimension associated with the at least one element, comprises: determining contextual information associated with the first image; determining contextual information associated with the second image; applying the rendering scale factor to the first image based on the contextual information associated with the first image; and applying a weighted rendering scale factor to the second image based on the contextual information associated with the second image.

Clause 16: A computer-readable storage medium having computer-executable instructions stored thereupon which, when executed by a computer, cause the computer to: render a document including a plurality of elements; receive a command to apply a rendering scale factor to the document; select at least one element from the plurality of elements; determine at least one dimension associated with the at least one element based on the rendering scale factor; and rendering the document utilizing the at least one dimension associated with the at least one element.

Clause 17: The computer-readable storage medium of clause 16, wherein the at least one element from the plurality of elements is selected based on a data type of the at least one element.

Clause 18: The computer-readable storage medium of clauses 16-17, wherein the at least one element from the plurality of elements is selected based on contextual information associated with the at least one element.

Clause 19: The computer-readable storage medium of clauses 16-18, wherein the at least one element from the plurality of elements is selected based on a data type of the at least one element and an arrangement of other elements of the plurality of elements.

Clause 20: The computer-readable storage medium of clauses 16-19, wherein the at least one dimension is determined based on an inverse of the rendering scale factor.

Based on the foregoing, it should be appreciated that concepts and technologies have been disclosed herein that provide dynamic adjustment of select elements of a document. Although the subject matter presented herein has been described in language specific to computer structural features, methodological and transformative acts, specific computing machinery, and computer readable media, it is to be understood that the invention defined in the appended claims is not necessarily limited to the specific features, acts, or media described herein. Rather, the specific features, acts and mediums are disclosed as example forms of implementing the claims.

The subject matter described above is provided by way of illustration only and should not be construed as limiting. Various modifications and changes may be made to the subject matter described herein without following the example configurations and applications illustrated and described, and without departing from the true spirit and scope of the present invention, which is set forth in the following claims.

What is claimed is:

1. A computer-implemented method, the method comprising:
   rendering, at a computing device, a document including a formatting element and text arranged within a boundary of the formatting element, wherein the boundary maintains the text within a viewing area of a display device;
   receiving a command to apply a first scale factor to the text of the document;
   determining at least one dimension of the boundary of the formatting element of the document based on a second scale factor that is based on an inverse of the first scale factor;
   rendering the document, wherein the text is rendered based on the first scale factor, and wherein the at least one dimension of the boundary is rendered based on the second scale factor that is based on the inverse of the first scale factor, wherein a magnitude of the second scale factor is adjusted above the inverse of the first scale factor based on an increase of a magnitude of the first scale factor, and wherein the boundary is rendered to maintain the text within the viewing area of the display device; and
   in response to the rendering of the document, displaying the text without requiring a user to scroll horizontally or vertically to view the rendered text.

2. The computer-implemented method of claim 1, wherein determining the at least one dimension comprises:
   determining contextual information associated with the formatting element;
   determining a weight that is based on the contextual information and the inverse of the rendering scale factor; and
   determining the at least one dimension of the boundary of the formatting element based on the weight.

3. The computer-implemented method of claim 1, wherein the document comprises an image, and wherein rendering the document comprises:
   determining contextual information associated with content of the image;

determining if the rendering scale factor is to be applied to the image based on the contextual information; and applying the rendering scale factor to the image if it is determined that the rendering scale factor is to be applied to the image.

4. The computer-implemented method of claim 1, wherein the document comprises an image, and wherein rendering the document comprises:

determining contextual information associated with content of the image;

determining a weighted rendering scale factor based on the rendering scale factor and the contextual information associated with the image; and applying the weighted rendering scale factor to the image.

5. The computer-implemented method of claim 1, wherein the document comprises a first image and a second image, and wherein rendering the document comprises:

determining contextual information associated with the first image;

determining contextual information associated with the second image;

applying the rendering scale factor to the first image based on the contextual information associated with the first image; and applying a weighted rendering scale factor to the second image based on the contextual information associated with the second image.

6. A computer, comprising:

a processor; and a computer-readable storage medium in communication with the processor, the computer-readable storage medium having computer-executable instructions stored thereupon which, when executed by the processor, cause the computer to render a document including a formatting element and text arranged within a boundary of the formatting element, wherein the boundary maintains the text within a viewing area of a display device, receive a command to apply a first scale factor to the text of the document, determine at least one dimension of the boundary of the formatting element based on a second scale factor that is based on an inverse of the first scale factor, render the document, wherein the text is rendered based on the first scale factor, and wherein the at least one dimension of the boundary is rendered based on the second scale factor that is based on the inverse of the first scale factor, wherein a magnitude of the second scale factor is adjusted above the inverse of the first scale factor based on an increase of a magnitude of the first rendering scale factor, and wherein the boundary is rendered to maintain the text within the viewing area of the display device; and in response to the rendering of the document, display the text without requiring a user to scroll horizontally to view the rendered text.

7. The computer of claim 6, wherein the formatting element comprises a frame around the text of the document.

8. The computer of claim 6, wherein the formatting element comprises a table around the text of the document.

9. The computer of claim 6, wherein determining the at least one dimension comprises:

determining contextual information associated with the formatting element;

determining a weight that is based on the contextual information and the inverse of the rendering scale factor; and determining the at least one dimension of the boundary of the formatting element based on the weight.

10. The computer of claim 6, wherein the document comprises an image, and wherein rendering the document utilizing the at least one dimension associated with the at least one element, comprises:

determining contextual information associated with the image;

determining if the rendering scale factor is to be applied to the image based on the contextual information; and applying the rendering scale factor to the image if it is determined that the rendering scale factor is to be applied to the image.

11. The computer of claim 6, wherein the document comprises an image, and wherein rendering the document utilizing the at least one dimension associated with the at least one element, comprises:

determining contextual information associated with the image;

determining a weighted rendering scale factor based on the rendering scale factor and the contextual information associated with the image; and applying the weighted rendering scale factor to the image.

12. The computer of claim 6, wherein the document comprises a first image and a second image, and wherein rendering the document utilizing the at least one dimension associated with the at least one element, comprises:

determining contextual information associated with the first image;

determining contextual information associated with the second image;

applying the rendering scale factor to the first image based on the contextual information associated with the first image; and applying a weighted rendering scale factor to the second image based on the contextual information associated with the second image.

13. A computer-readable storage medium having computer-executable instructions stored thereupon which, when executed by a computer, cause the computer to:

render a document including a formatting element and text arranged within a boundary of the formatting element, wherein the boundary maintains the text within a viewing area of a display device;

receive a command to apply a first scale factor to the text of the document;

determine at least one dimension of the boundary of the formatting element based on a second scale factor that is based on an inverse of the first scale factor;

render the document, wherein the text is rendered based on the first scale factor, and wherein the at least one dimension of the boundary is rendered based on the second scale factor that is based on the inverse of the first scale factor, wherein a magnitude of the second scale factor is adjusted above the inverse of the first scale factor based on an increase of a magnitude of the first scale factor, and wherein the boundary is rendered to maintain the text within the viewing area of the display device; and in response to the rendering of the document, display the text without requiring a user to scroll horizontally to view the rendered text.

14. The computer-readable storage medium of claim 13, wherein the formatting element comprises a frame around the text of the document.

15. The computer-readable storage medium of claim 13, wherein the formatting element comprises a table around the text of the document.

\* \* \* \* \*